March 13, 1962  B. ALEXANDER ET AL  3,025,514
COLLISION AVOIDANCE SYSTEM
Filed Jan. 10, 1958  16 Sheets-Sheet 1

Inventors
BEN ALEXANDER
MARTIN PRESS
JOSEPH MURGIO
By
Attorney

March 13, 1962     B. ALEXANDER ET AL     3,025,514
COLLISION AVOIDANCE SYSTEM
Filed Jan. 10, 1958     16 Sheets-Sheet 4
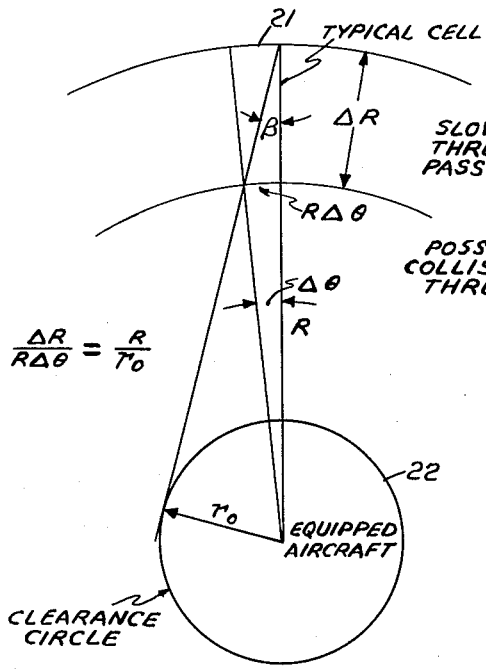
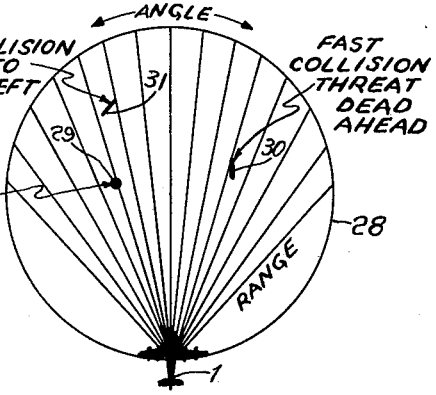
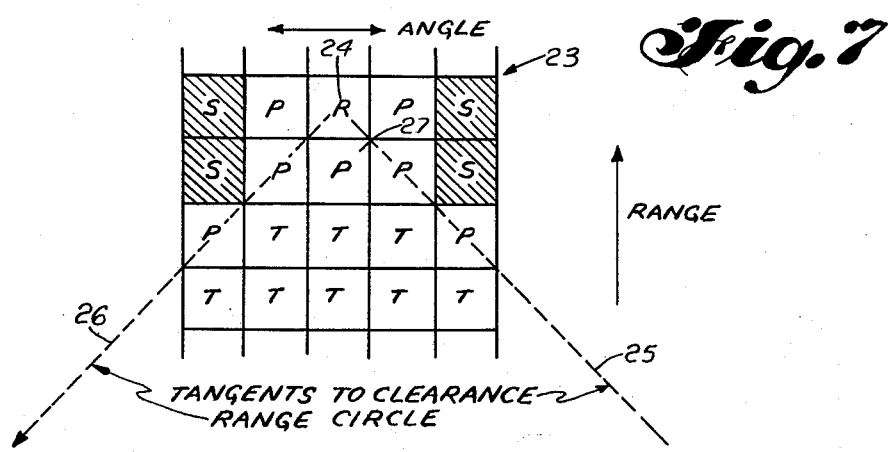
Inventors
BEN ALEXANDER
MARTIN PRESS
JOSEPH MURGIO
By
Attorney

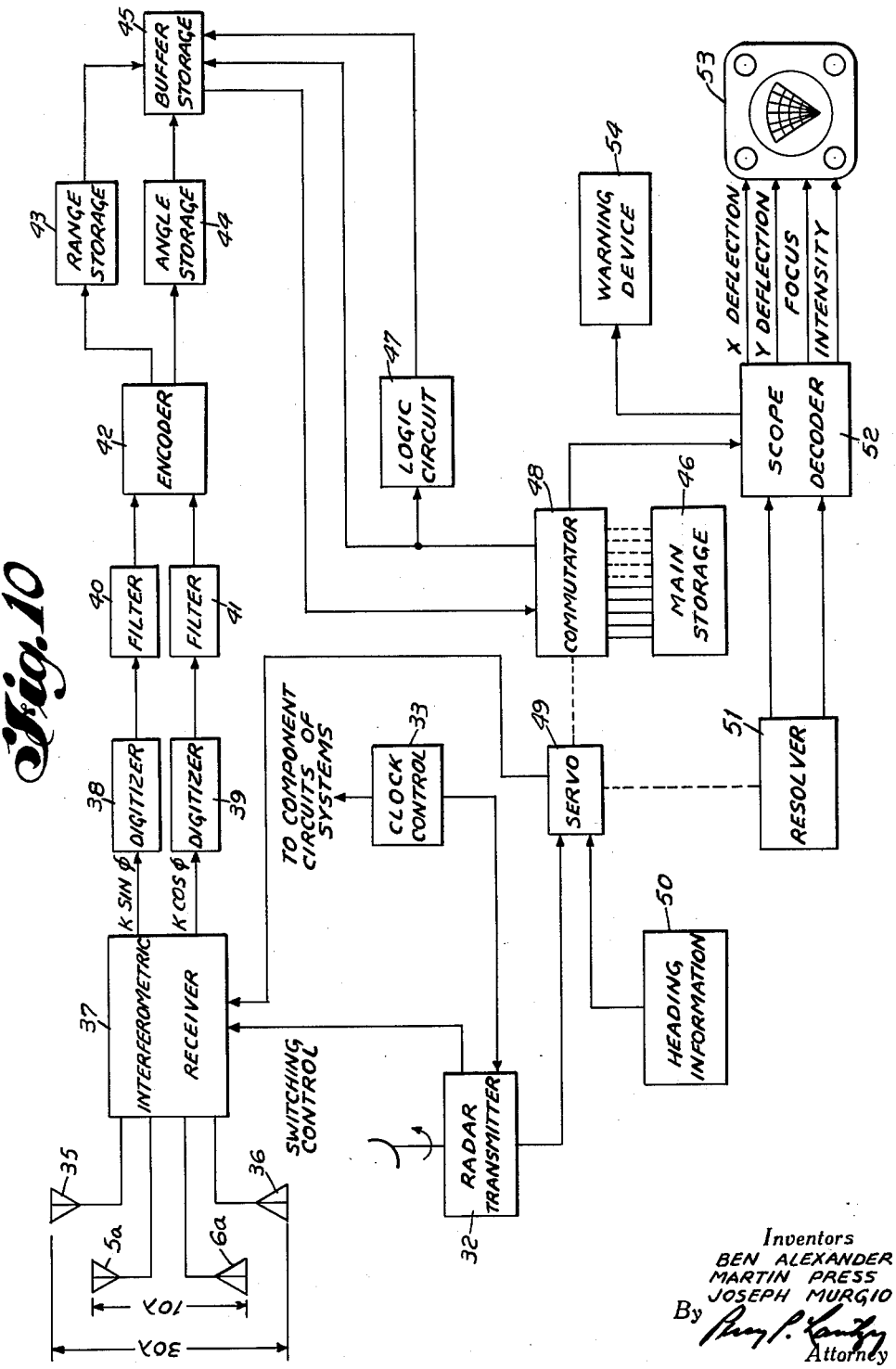

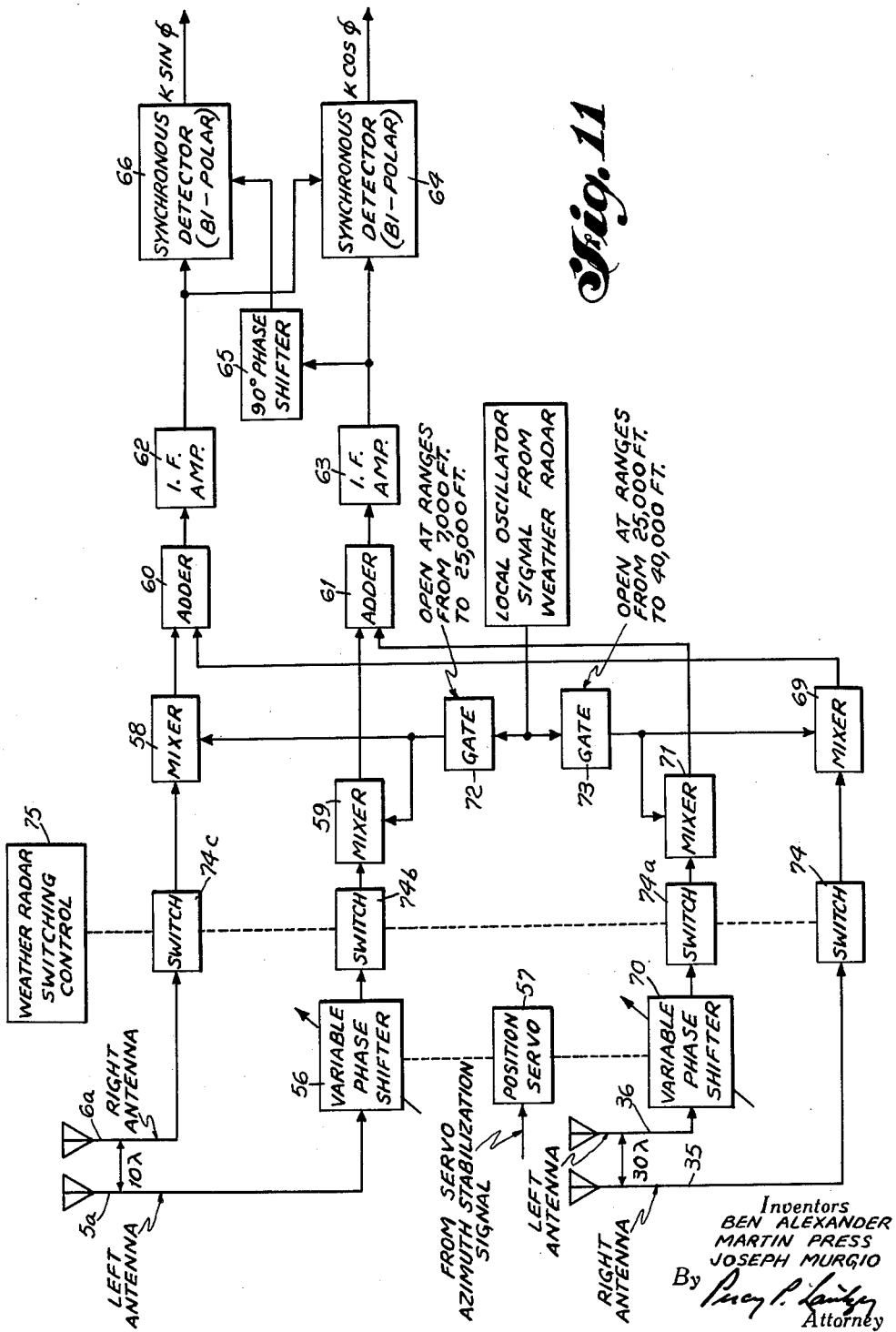

Inventors
BEN ALEXANDER
MARTIN PRESS
JOSEPH MURGIO
By [signature]
Attorney

March 13, 1962 B. ALEXANDER ET AL 3,025,514
COLLISION AVOIDANCE SYSTEM
Filed Jan. 10, 1958 16 Sheets-Sheet 15

DIAGRAM OF THE CODED WORD EMPLOYED IN SYSTEM

Inventors
BEN ALEXANDER
MARTIN PRESS
JOSEPH MURGIO
By
Attorney

March 13, 1962  B. ALEXANDER ET AL  3,025,514
COLLISION AVOIDANCE SYSTEM
Filed Jan. 10, 1958  16 Sheets-Sheet 16

Fig. 22

| PHASE ANGLE | CODE | CONDITIONS | | | |
|---|---|---|---|---|---|
| 0 | 0000 | $x>0$ | $y>0$ | $x>y$ | $\frac{x}{2}>y$ |
| 1 | 0001 | | | | $\frac{x}{2}<y$ |
| 2 | 0010 | | | $y>x$ | $\frac{y}{2}<x$ |
| 3 | 0011 | | | | $\frac{y}{2}>x$ |
| 4 | 0100 | $x<0$ | | $y>|x|$ | $\frac{y}{2}>|x|$ |
| 5 | 0101 | | | | $\frac{y}{2}<|x|$ |
| 6 | 0110 | | | $|x|>y$ | $\frac{|x|}{2}<y$ |
| 7 | 0111 | | | | $\frac{|x|}{2}>y$ |
| 8 | 1000 | $x>0$ | $y<0$ | $|x|>|y|$ | $\frac{|x|}{2}>|y|$ |
| 9 | 1001 | | | | $\frac{|x|}{2}<|y|$ |
| 10 | 1010 | | | $|y|>|x|$ | $\frac{|y|}{2}<|x|$ |
| 11 | 1011 | | | | $\frac{|y|}{2}>|x|$ |
| 12 | 1100 | $x<0$ | | $|y|>x$ | $\frac{|y|}{2}>x$ |
| 13 | 1101 | | | | $\frac{|y|}{2}<x$ |
| 14 | 1110 | | | $x>|y|$ | $\frac{x}{2}<|y|$ |
| 15 | 1111 | | | | $\frac{x}{2}>|y|$ |

TABLE FOR ANGLE ENCODING

Fig. 24

| | A | A | A | |
| --- | --- | --- | --- | --- |
| | B | B | B | |
| B | C | C | C | B — 23a |
| D | D | D | D | D |

A. HOLD OLD
B. HOLD OLD, LABEL AS POSSIBLE
C. PUT IN NEW, LABEL AS SLOW THREAT
D. PUT IN NEW, LABEL AS FAST THREAT

Inventors
BEN ALEXANDER
MARTIN PRESS
JOSEPH MURGIO
By
Attorney

United States Patent Office

3,025,514
Patented Mar. 13, 1962

3,025,514
COLLISION AVOIDANCE SYSTEM
Ben Alexander, Nutley, Martin Press, Englewood, and Joseph Murgio, Clifton, N.J., assignors to International Telephone and Telegraph Corporation, Nutley, N.J., a corporation of Maryland
Filed Jan. 10, 1958, Ser. No. 728,505
20 Claims. (Cl. 343—5)

This invention relates to a collision avoidance system and more particularly to an electronic collision avoidance system for aircraft.

The danger of airplane collisions has become an urgent problem. A few spectacular accidents and a disturbing number of near collisions have drawn the attention of the public and of the experts to the difficult problem of averting such accidents. With the advent of jet airliners with greater speeds and the increased number of airplanes both privately owned and commercial render the situation more critical. Surveys have shown that the accidents and near accidents are due basically to the limitations of the pilot in seeing other aircraft, evaluating the collision risk and making in time the proper maneuver. The reasons for these limitations are obvious. In zero visibility weather, in regions without traffic control, the pilot knows absolutely nothing about aircraft in the vicinity. In clear weather with good visibility when apparently a large number of near collisions have been observed, the airplane cockpit prevents an all around view of the pilot. Even in the sector where he could see, the pilot sometimes fails to detect an intruding aircraft due to lack of attention or to space myopia. When he has seen the intruder, he may be distracted by his other functions and so have difficulty in following the intruder as it continues on its flight. In regions of low density traffic, it is certainly difficult to keep watch for an event of near collision. On the other hand, in regions of high density traffic, too many airplanes in a disorderly pattern may form a confusing picture and make it very difficult for the pilot to make the proper decision.

A system of collision avoidance should therefore provide instruments to assist the pilot in these tasks. It should extend or supplement his faculties or even be automatic in the detection and warning of possible collisions. For instance, with fast flying airplanes, even assuming the best conditions of vision, the pilot may have less than ten seconds from the first detection of an intruder as a speck in forward space to the time of collision with the intruder. This is too short a period in which to decide whether a collision risk exists and then to take an evasive maneuver. Ideally, to replace the pilot, the collision avoidance system must perform three functions:

(1) It must find information about the present position and relative state of motion of the intruding aircraft.

(2) It must project this information into the future to predict where these intruding aircraft are likely to be at any time later with respect to the course of flight of the airplane equipped with such a system.

(3) When a risk of collision has been ascertained, the system must decide what is the best evasive maneuver or it must present the pilot with a picture of the situation easily understandable that will help him to make the proper maneuver.

These three functions may be called the sensing function, the prediction function and the decision function. For the sensing function, the superior choice would appear to be radar. With regard to prediction, certain assumptions must be made. Unless other aircraft are able to communicate their intentions, the pilot must base his extrapolation on the present observed relative position and motion of the intruding aircraft. With reasonable equipment, it is not practical to sense turning rates of other aircraft, and therefore, the assumption of a straight uniform course must be made. Another assumption to be made is that the speed of the aircraft concerned remains constant. The decision function must bring into consideration multiple threats and has to be based on definite rules of the road as applied to aircraft. Because of the normal layering of air traffic, it is desirable to avoid changes in altitude. Even if a change in altitude were to provide quicker escape, it should be reserved only for very close situations. The most widely accepted maneuver is a level co-ordinated turn to the right or to the left.

It is important also in collision avoidance systems to keep as small as possible the proportion of false alarms, that is, the proportion of cases where an unnecessary maneuver is made because of the system. This should be reduced for psychological reasons especially if the evasive maneuver has to be important. It is also obvious that many false alarms would make the pilot disregard the warnings of the system. Furthermore, false alarms if followed would make it difficult for him to keep on course. Another consequence of false alarms is the risk of causing collisions that would not normally occur. This is a secondary effect difficult to evaluate but will be reduced automatically by making false alarms as rare as possible.

An object of the present invention, therefore, is to provide a collision avoidance system for aircraft which will greatly decrease the danger of mid-air collisions without burdening the aircraft with prohibitively expensive equipment and one which will not unduly generate false alarms by proximate aircraft which would pass by safely.

Another object is to provide a collision avoidance system for aircraft which will automatically sense and predict the threat of a collision and warn the pilot in such a manner as to help him decide quickly how to perform an evasive maneuver.

Still another object is to provide a collision avoidance system which will continually scan the sector forward of the equipped aircraft and detect the presence of intruding aircraft in such sector, detect the course and the relative speed of movement of such intruding aircraft and predict whether or not each such detected aircraft is flying on a threatened collision course with respect to the equipped aircraft.

A feature of the invention is to use the present weather radar on board aircraft for the purpose of detecting the presence of other aircraft forward of the equipped aircraft. Means are provided in conjunction with the radar to obtain information as to the position fix and relative movement of such other aircraft and to translate this information into a form which is readily employed to determine the courses of each such other aircraft relative to the course of movement of the equipped aircraft. The system includes a display of craft locations and movements for the pilot to see and also means to warn the pilot sufficiently early when an intruding aircraft imposes a threatened collision so that he may make an evasive maneuver and thereby avoid collision.

Still another feature is the provision of means to encode the azimuth and range formation of intruding aircraft whereby such information can be stored and compared with subsequently detected information to determine the course and speed of movement of such aircraft and to predict whether any such aircraft imposes a serious threat of collision. Means are also provided to decode the information and display it in a manner to present a continuous indication of the relative positions and movements of aircraft located forward of the equipped aircraft.

Still another feature is the provision of a logic circuit which is used to divide into cells the area in the plane of flight between an intruding aircraft and the equipped aircraft and to use certain of these cells as a criteria for a possible collision zone with which subsequently detected azimuth and range information of the intruding aircraft is compared to determine if the intruding aircraft is proceeding on a threatened collision course.

The above-mentioned and other features and objects of this invention will become more apparent by reference to the following description taken in conjunction with the accompanying drawings, in which:

FIG. 6 is a diagram illustrating the collision path geometry;

FIG. 7 is a diagram of an expanded view of a quantized space to illustrate the collision criteria;

FIG. 8 is a diagram showing a possible collision zone determined by the collision criteria;

FIG. 9 is an illustration of the visual display indications of the display oscilloscope;

FIG. 10 is a block diagram showing generally the main components of the collision avoidance system;

FIGS. 11–19 show when taken together a detailed schematic and block diagram of the collision avoidance system;

FIG. 22 is a table showing angle encoding rules;

FIG. 24 is a diagram of the criteria for the logic.

Figure 1:
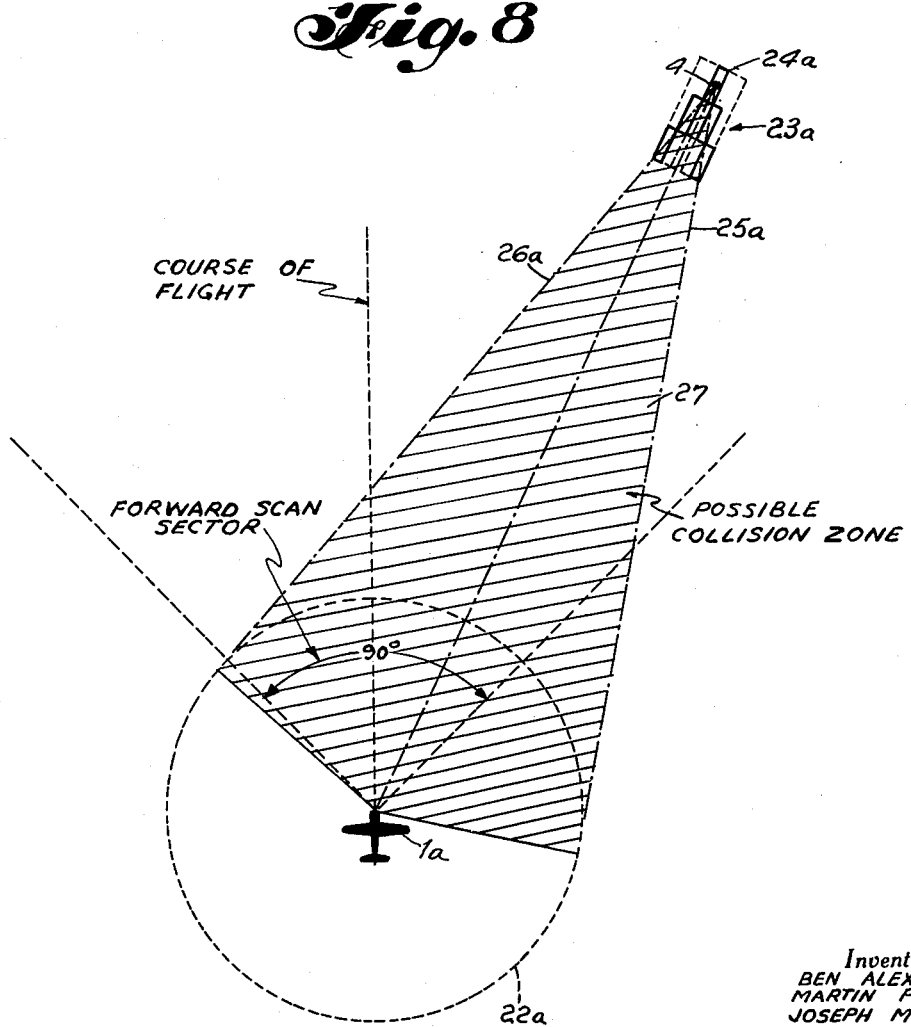
FIG. 1 is a view in vertical elevation of an aircraft equipped with a collision avoidance system indicating the depth of the radiation beam forward of the aircraft.
Figure 2:
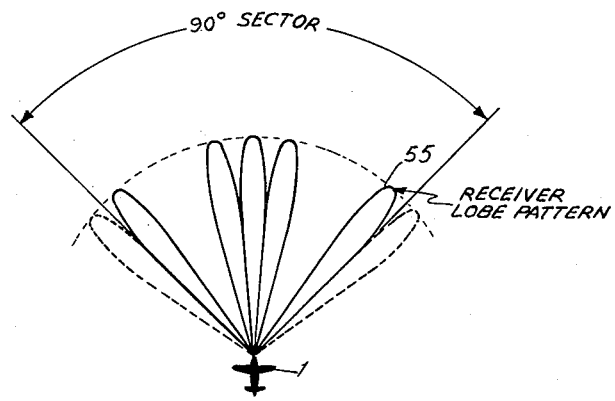
FIG. 2 is a view in plan of an aircraft showing the forward section which is scanned by the radar beam normally used for weather detection for intruding aircraft or other objects which may present collision threats.

With reference to FIGS. 1 and 2, there is shown an airplane 1 equipped with the collision avoidance system in the nose of which is mounted a radar antenna 2 which sends out a radar beam 3 having an angular height $\alpha$. This radar is of the weather radar type, such as the model AVQ–10 weather radar manufactured by the Radio Corporation of America, and which is standard equipment on many commercial aircraft. The beam angular height of the radar beam transmitted by this weather radar is approximately 7 degrees, although it may be made larger if desired, and the beam angular width is approximately 2 degrees. The weather radar scans the 180 degrees of azimuth forward of the aircraft, but for purposes of this system only reradiations from objects within the forward center sector of 90 degrees are received because surveys have shown that the danger of collisons is more eminent from objects in front of the airplane within this 90-degree sector.. It is to be noted that even though objects within the beam height $\alpha$ in the 90-degree sector will be detected, for this system the 90-degree forward sector is considered a plane area. It can be assumed that because of the layering of commercial aircraft which fly a course at a predetermined altitude that the major danger of collision is with objects in a plane area forward of the aircraft. Even though aircraft may change their altitude layer during the course of flight because of adverse weather conditions or flight traffic conditions, the danger of collision in such cases may be taken care of by proximity warning systems.

It will be understood, however, that the present invention is not limited to a 90-degree sector but that the 180-degree forward sector may be scanned for collision avoidance purposes. It is also within the purview of the invention to extend this type of object detection to the entire space about the aircraft so that the pilot could avoid collision with any object regardless of its angle of approach toward the flight course of the aircraft.

Figure 3:
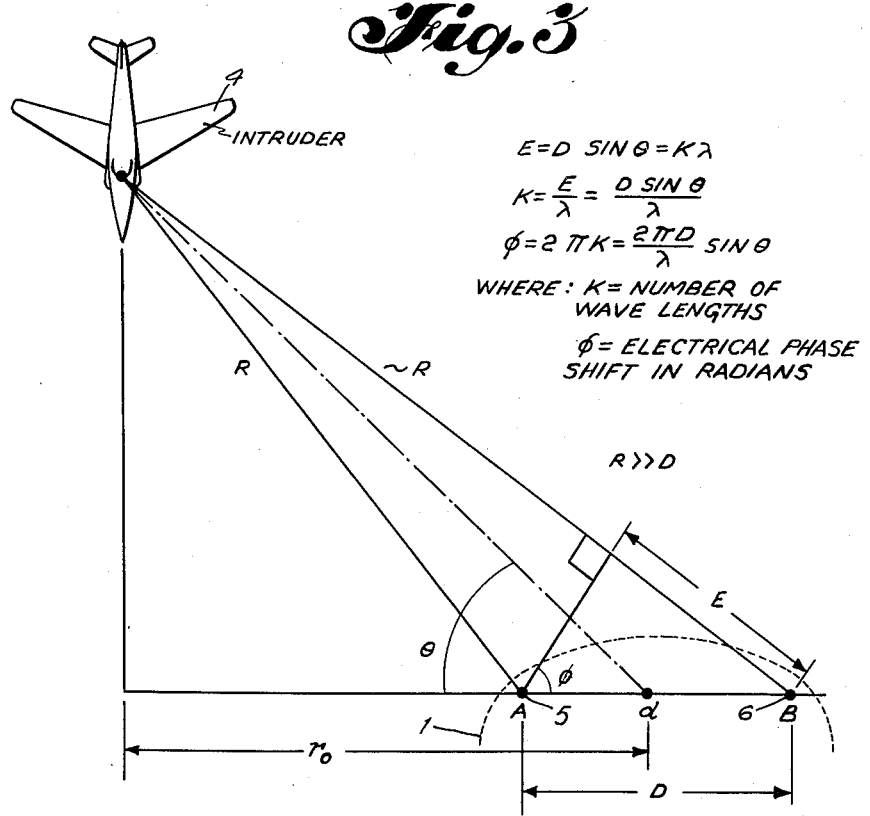
FIG. 3 shows schematically the antenna locations of the equipped aircraft and the location of an intruding aircraft for an explanation of the interference geometry involved.

In FIG. 3 there is shown an intruder airplane 4 and two spaced antennas 5 and 6 mounted on an aircraft 1 carrying the collision avoidance system of this invention. These spaced antennas 5 and 6 receive reradiations of the radar beam 3 from the intruder 4 which is at a range R from the aircraft. Therefore, the angle of arrival of the radiated signal from the aircraft 4 is $\theta$, and from this angular difference in the arrival of the reradiated signal at antennas 5 and 6, the interferometric receiver of the collision avoidance system will determine the azimuth position of the intruder 4.

Figure 4:
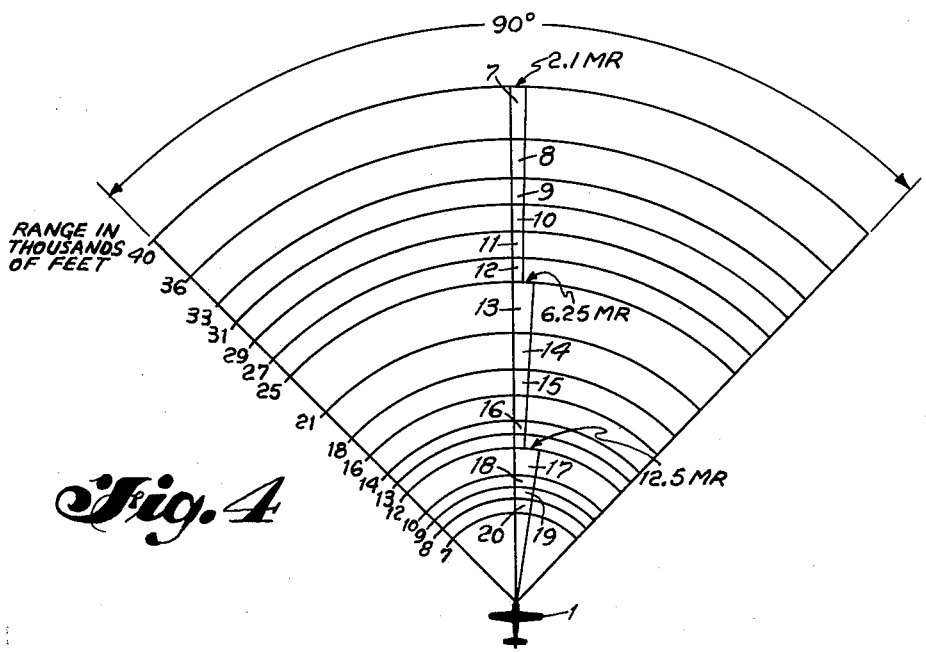
FIG. 4 shows the forward sector as it is spaced quantized by the collision avoidance system.

The collision avoidance system of this invention is not based on the measurement of the rates of travel of aircraft, but rather the path of an intruder aircraft is continuously measured in terms of actual positions in space relative to the aircraft coordinate system. That is to say, the space, in this case the 90-degree forward sector of the aircraft 1, is quantized in a special way by dividing that space into cells and the position of the intruder is denoted by the space cell in which that intruder is located. In FIG. 4 there is shown the space quantization of the 90-degree forward sector used in the collision avoidance system. Each cell is defined by range and azimuth boundaries as shown in FIG. 4. However, for purposes of illustration only and disregarding the exact relative size, there are shown representative cells extending from the extreme 40,000-foot range, which is assumed to be the range of the weather radar, to 7,000 feet of the airplane 1. The cell 7, which is representative of all the cells within the ranges 36 to 40,000 feet, has an angular width of 2.1 milliradians and a length of 4,000 feet. Cell 8 has the same angular width as cell 7, but the length is shorter by 1,000 feet. Cells 9, 10, 11, and 12 have the same angular width and the same length of 2,000 feet. From the ranges of 25,000 down to 12,000 feet, the angular cell width is 6.25 milliradians and the lengths respectively are 4,000, 3,000, 2,000, and 1,000 feet as shown. Within the ranges 12 to 7,000 feet, the angular width of the cells is 12.5 milliradians and the length of the cells vary as shown from 2,000 feet for cell 17 to 1,000 feet for the other cells 18, 19 and 20. The explanation for the variation in the sizes of the cells will be given later on. It is understood that although only one representative cell in each annular ring has been shown, exactly the same size cells are present throughout the same annular ring in the 90-degree sector.

Figure 5:
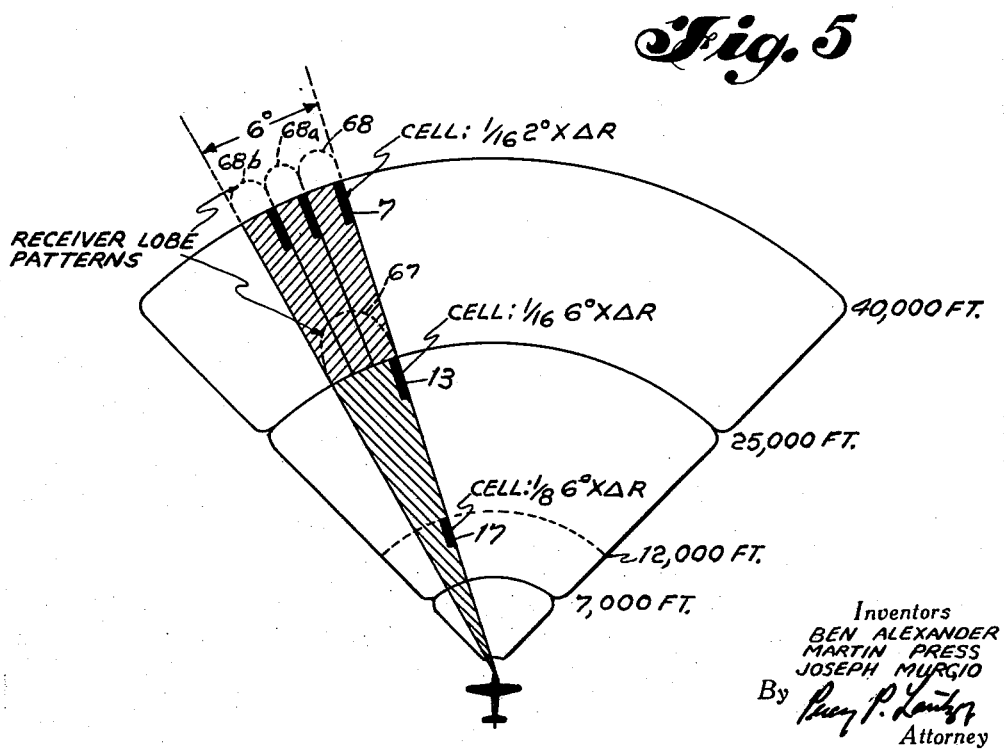
FIG. 5 is a view similar to FIG. 4 showing the 90-degree sector divided into sub-sectors and cells within the sub-sectors.

Another view of the space quantization is shown in FIG. 5 and reveals a swept sector of 6 degrees which has been subdivided into three equal sub-sectors in the ranges from 25,000 to 40,000 feet. In the ranges from 25,000 feet to 7,000 feet, the swept sector of 6 degrees is not divided into sub-sectors. Cell 7 is shown in the top layer of the sector adjacent the 40,000-foot range. Cell 13 is shown in the range adjacent 25,000 feet, and cell 17 is shown adjacent to the 12,000-foot range. In FIG. 6 the collision path geometry of this system is set forth and shows a typical cell 21 having a width $\Delta\theta$ and a length in range of $\Delta R$. $r_0$ is the diameter of a protective circle 22, nominally 1,000 feet, at the center of which is the aircraft 1 equipped with the collision avoidance system. R is the range of the intruder which may be anywhere within the cell 21. $\theta$ is the bearing angle of the intruder and $\beta$ is the angle determined by the diagonal through the cell 21 which, when extended, is tangent to the protective circle 22. The collision criteria of this invention may be seen by examination of FIG. 7. This is an expanded view of quantized space in the horizontal plane about the intruder aircraft being scrutinized and shows an array 23 of cells. During each scan of the weather radar antenna 2, approximately every 2 seconds, the intruder is illuminated for approximately 1/30 of a second. In this time his new position is measured and his new cell location is determined. In FIG. 7 the cell position 24 of the intruder known from the earlier scan (the "old" information) is labeled "R," the reference quanta. In the array 23 about this cell 24 are the possible locations for the intruder position when the latest scan information, the new information, is evaluated. The diagonals 25 and 26 of the cell R, when extended, are tangent to the protective circle 22. If the new information regarding the location of the intruder places it within any of the cells in the array 24 through which the diagonals 25 and 26 pass or any of the cells enclosed by these diagonals, then it is seen that there exists a possible threat or a threat to the aircraft 1 which is at the center of the protective circle. It is obvious that the intruder, as it continues on its present course as defined by its positions in the reference cell and a cell lying between the diagonals 25 and 26, except for cell 27, will pass within the protective circle 22 and therefore constitutes a collision danger. If the second position of the intruder is in any cell labeled S, then it can be considered that the intruder is flying a safe course as far as the aircraft 1 is considered. If the position of the intruder falls within any of the boxes labeled P, then it must be considered a possible threat because not enough information is then available to determine definitely whether the intruder course is a safe course or a threat course.

In FIG. 8 the relation of the collision criteria to the equipped aircraft 1 is shown. The intruder 4 has been located in the cell 24a of the collision criteria array 23a and the diagonals 25a and 26a passing across the cells within the array 23a, with the apex of the diagonals in the reference cell 24a, have been extended to the points of tangency with the protective circle 22a. The space within the diagonals 25a and 26a and the lines drawn from the point of tangency of the diagonals with the protective circle to the center of the circle, which is the equipped aircraft 1a, constitutes a possible collision zone 27. It is understood that the possible collision zone 27 is true for the first detected position of the intruder 4. As the new position information of the intruder is received on the succeeding scan of the radar antenna, its position in the array 23a is determined and the criteria to determine if its course is a threat. If the determination is a threat, a new array is synthesized; if a possible threat, the old array is held. When the new array is synthesized, the later position information is located in a cell which is now a new reference cell of a new array (not shown). New diagonal tangent lines are then formed to define a new possible collision zone with the new array and its reference cell at the apex of this new collision zone. This process continues as long as the intruder is within the scanned forward sector.

Definite rules are required to determine the correct quantization of the cells. Dimensions of the cells are adjusted so that the labels, that is, safe, threat or possible threat given to possible new positions in FIG. 7 are accurate for the range at which the zone is located. From the geometry in FIG. 6 it can be shown that the cell labels are correct if $$\frac{\Delta\theta}{\Delta R} = \frac{r_0}{R^2} \quad (1)$$

Therefore, the aspect ratio $$\frac{\Delta\theta}{\Delta R}$$

or the ratio of width to height, or the cells must vary with range as given above. When this is assured, then the new and old cell locations for an intruder's path will automatically determine whether it is threatening or not. The position of an intruder when first detected is known to be in a given cell. The coordinates of this cell are stored in a digital computer storage circuit, and subsequent information concerning the range and azimuth of the intruder are compared with the original information to determine $\delta\theta$ and $\delta R$ in terms of the number of cells traversed where $\delta\theta$ and $\delta R$ are the change in coordinates. The logic circuit of this digital computer then evaluates the intruder initially located in reference cell 24 according to the criteria described above, either safe, possible threat or threat.

The range of increments or the change in R can be only in 1,000-foot steps, which limit is set by the weather radar's 2 microseconds transmitter pulse. Cells with the angular dimension of 2.1 milliradians are obtained by means of the interferometric receiver and the digital data processing techniques of the collision avoidance system. An interferometer with antennas spaced 30 wavelengths apart (22.5 inches at C band) yields an antenna lobe structure with 2-degree lobe widths at the center of the pattern. By using the digital data processing techniques of this system, it is possible to determine the presence of a target within 1/16 of an interferometer lobe without any difficulty. In order to satisfy Equation 1, the cell dimensions are determined as follows: If the range decreases for a given $\Delta\theta$, the dimensions of $\Delta R$ must decrease. Due to the minimum of $\Delta R$ dimension limit set by the pulse length, it becomes necessary to increase $\Delta\theta$ at two points in the pattern as shown in FIG. 4. The increase in $\Delta\theta$ at 25,000 feet is accomplished by the use of a second set of antennas for intruders with ranges less than 25,000 feet. The second set of antennas yields an interferometric pattern lobe width of 6 degrees at the center pattern. The increase in the $\Delta\theta$ dimension at 12,000 feet is carried out by the logic. In this case it determines the position of an intruder within 1/8 of a lobe. However, $r_0$ must vary as a result of not being able to follow Equation 1 smoothly from approximately 770 feet minimum to a maximum of 1,250 feet.

The ambiguity due to the lobe structure of the interferometer is resolved by the use of sector switching. Information on the position of an intruder is stored by sector. The 90-degree forward sector is divided into fifteen 6-degree sectors. As the beam of the weather radar (which is 2 degrees for the C band radar using a 22-inch reflector) illuminates a sector for approximately 1/90 of a second based on a 30-r.p.m. scan speed, the information in a given sector is processed.

It is to be understood that the space quantization as explained above has been selected as typical values in view of the weather radar and the collision avoidance system may be changed as the need arises.

After the collision criteria has determined the nature of the intruder course, then the information is given to the pilot of the equipped aircraft by means of a visual display, and if an actual threat is indicated, an aural alarm is sounded. In FIG. 9 is shown a visual display of such information with three intruders detected in the forward sector which are following courses that constitute a possible threat or threat to the equipped aircraft 1. A possible threat is shown on the scope screen 28 as a defocused blur 29, a fast collision threat is shown as a relatively long line 30, and a slow collision threat is displayed as a relatively short line 31. The slant of the line indicates the relative course of the intruder and on which side of the equipped aircraft the intruder will fly if it continues on its present course. The pilot makes his maneuver decision on the basis of the aural and visual information thus given to him.

A block diagram of the over-all system including the weather radar transmitter 32 is shown in FIG. 10. There are essentially three sections: the sensing section, the data processing section, and the display and control section. The task of the sensing section is to receive, amplify and detect radar reradiation from intruder aircraft. This is accomplished by the use of pairs of spaced antennae, 5a, 6a and 35, 36 and an interferometric receiver 37. The theory and detailed description of this receiver is given later in connection with FIG. 11. The output of the receiver 37 contains information about ranges and angular positions of the intruders in the sector being examined. The data processing section accepts this information from the sensing section and converts it immediately from analog to digital form by means of digitizers 38 and 39. Then after filtering at 40 and 41 and coding at 42 and storing in range storage 43, angle storage 44, buffer storage 45, and main storage 46, it applies the collision criteria of logic circuit 47 to the stored information as a test for danger. The stored information is transferred to the logic circuit 47 by means of commutator 48 which is driven by a servo 49 which in turn is controlled by the radar transmitter 32 and accepts heading information 50. A resolver 51 coupled to the servo 49 transmits to the scope decoder the information concerning the subsector of the forward sector being examined in analog form. A scope decoder 52 receives digital information from the logic circuit 47 via the commutator 48 and decodes that information. If the information contains a warning of a possible threat or a threat, that information is then fed into an oscilloscope display 53 for visual presentation to the pilot. Simultaneously, warning information is fed from the scope decoder to a warning device 54. A clock 33 controls and synchronizes the operation of the different circuits of the system. These processes are described in detail later on.

The azimuth position determination of the intruder is accomplished through the application of interference principles by the interferometer receiver 37, the schematic block diagram of which is shown in FIG. 11. The paired antennae 5a and 6a possess a receiver lobe pattern 55 as shown in FIG. 2. Referring to FIG. 3 and the interference geometry shown therein, it is seen that a reradiated signal from the intruder 4 travels a distance R to antenna 5 and, since $R \gg D$ to a first order approximation, the signal travels a distance $R+E$ to antenna 6a. It therefore follows that:

$$E = D \sin \theta = K\lambda$$
$$K = \frac{E}{\lambda} = \frac{D \sin \theta}{\lambda}$$
$$\phi = 2\pi K = \frac{2\pi D}{\lambda} \sin \theta$$

$K$ = number of wavelengths
$\phi$ = electrical phase shift in radians
$\theta$ = geometric bearing angle
$E$ = difference in path length
$D$ = distance between antennas
$\lambda$ = wavelength of received signal If the signals from antennae 5a and 6a are applied to the system shown in FIG. 11, two output voltages are obtained: one proportional to sin $\phi$ and the other proportional to cos $\phi$. The signal at antenna 5a is $E_1 \sin \omega_c t$ and at antenna 6a it is $E_1 \sin (\omega_c t + \phi)$ where $\omega_c$ is the carrier frequency and $\phi$ is the phase shift angle due to the difference in path length. The signal from antenna 5a can be phase shifted by an R.-F. phase shifter 56 to remove the rotational motion of the equipped aircraft 1. The phase shifter must be slaved to a heading reference to achieve proper data correction in the horizontal plane. This heading reference signal is applied from the autopilot gyro of the aircraft 1 to position servo 57 via the servo 49. Signals from antennae 5a and 6a are beat against the local oscillator frequency supplied by the weather radar 32 in mixers 58 and 59. Disregarding for the time being the function of the adders 60 and 61 in combining the signals from the paired antennas 35, 36 with the signals from the paired antennae 5a and 6a and considering only the signals from antennae 5a and 6a, these signals are fed into I.-F. amplifiers 62 and 63. The signals after being amplified in the I.-F. amplifier are fed into a synchronous bipolar detector 64 (where they are multiplied together) yielding the following output:

$$E_0 = \frac{K_1 E_1 E_2}{2} \cos \phi + \frac{K_1 E_1 E_2}{2} \cos (2\omega_1 t + \phi)$$

The second term is eliminated by video filtering leaving:

$$E_{01} = K_2 \cos \phi$$

The output of I.-F. amplifier 63 is phase shifted 90 degrees in a 90-degree phase shifter 65 and fed to a second bipolar synchronous detector 66 together with the output of the I.-F. amplifier 62 to give a filtered output of $$E_{02} = K_2 \sin \phi$$

Since the purpose of the interferometric receiver is to obtain a fine indication of the bearing angle $\theta$, the use of two R.-F. sections with two pairs of spaced antennae is required in this system.

The antennae 5a and 6a with a spacing of 10λ have a receiver lobe pattern 67 with a lobe width of 6 degrees. The antennae 35 and 36 with a spacing of 30λ have a receiver lobe pattern 68 of 2 degrees. The 2-degree and 6-degree lobe widths are required by the space quantization system as heretofore described. The signal from antenna 35 is fed into mixer 69. The signal from antenna 36 is fed into a variable phase shifter 70 from where it is passed to a mixer 71. The local oscillator signal from the weather radar is then beat against the incoming signals in mixers 69 and 71. The output of mixer 69 is coupled to adder 60 where it is combined with the I.-F. signal from mixer 58. The signal from mixer 71 is fed into adder 61 where it is combined with the output of mixer 59. The local oscillator signal from the weather radar 32 applied to mixers 58, 59, 69, and 71 is controlled by gates 72 and 73. These gates 72 and 73 switch on the R.-F. section coupled to the 10λ spaced antennae 5a and 6a for the first 50 microseconds following the transmitting of the radar pulses from the weather radar and switch on the R.-F. section coupled to the 30λ spaced antennae 35 and 36 for the next 30 microseconds. The purpose of the switches 74, 74a, 74b, and 74c is to activate the two R.-F. sections of the receiver during the time that the weather radar scans the 90-degree forward sector and to deactivate the receiver for the remainder of the azimuth scan. To accomplish this, the switches 74, 74a, 74b, and 74c may be mechanical switches mechanically coupled to the weather radar antenna shaft as indicated by the weather radar switching control 75. Bipolar synchronous detectors 64 and 66 are used to yield receiver output pulses which can have either polarity.

Figure 12:
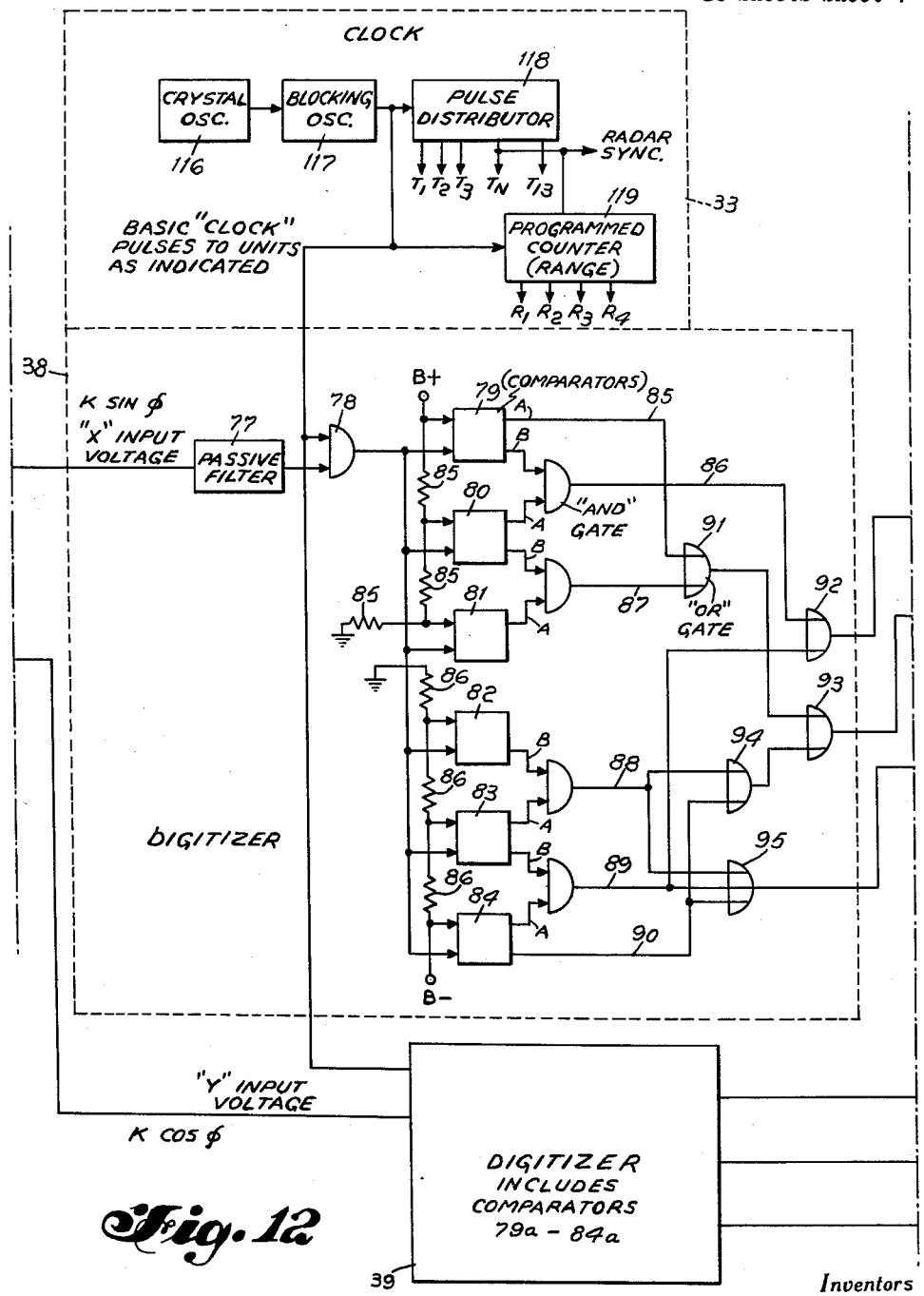

The input to the computer from the sensor consists of two signals labeled in FIGURE 12 $K$ cosine $\phi$ and $K$ sine $\phi$. The signals contain the information about the targets in the sector being examined in the following form: the range of the target is represented by the position in time of the return pulse with respect to the main bang as in conventional radar, and the angular position in a particular interferometer lobe is represented by the electrical phase angle $\phi$ between the two received signals. Each return is initiated by the main bang of the transmitter. At some time later indicating the range a pulse will appear on both output lines of the receiver and a relationship between the magnitudes will indicate the electrical phase $\phi$ between them. Because substantial noise is also present, the coordinate determination of the target cannot be made on a pulse to pulse basis; hence a filtering process must be used. In this system the magnitude of the two analog voltages $K$ cosine $\phi$ and $K$ sine $\phi$ are quantized to seven levels and are coded into a three bit straight binary code. This is accomplished in the digitizers 38 and 39.

With reference to FIG. 12 the input to the digitizer 38 is $K \sin \phi$. This is applied to a passive filter 77 to perform some preliminary smoothing. The output of the filter 77 is sampled in synchronism with the clock 33 at 2-microsecond intervals by means of AND gate 78. This signal is then digitized in the following way: A digitizing process with voltage comparator building blocks 79 to 84, inclusive, is used. Each block has as inputs two variables; one is a D.C. reference voltage B+ or B—, and the second the input pulse to be tested from the output of the passive filter 77. The B+ voltages to blocks 79, 80 and 81 vary because of the voltage divider resistor network 85. The B— voltages to blocks 82, 83 and 84 are divided down by the resistive network 86. Should the pulse be larger than the reference D.C. voltage for any comparator, a standard pulse (to be described later) will appear on output A of that comparator. Should the tested pulse be smaller than the reference D.C., a standard pulse will appear on output B of that comparator. In the digitizer 38 the B+ is divided up by the resistive network to various levels as explained above. This is also done with B— to give the negative reference levels. The pulse to be tested is then applied to the other inputs of the comparators and by the combination of output pulses, the level of the input pulse is determined. If the input pulse to a comparator is higher than the reference voltage of that comparator, an A output will result; if lower, a B output will result. The proper combination consists of a B output from one comparator and an A output from the comparator adjacent. This determines the voltage level of the input pulse. The magnitude of the signal is now indicated by the presence of a pulse on one of the three positive voltage lines 85, 86 and 87 or three negative voltage lines 88, 89 and 90. This information is then encoded by the OR gates 91, 92, 93, 94 and 95 of the digitizer 38 into a straight 3-bit binary code. The same process is repeated for the input signal $K \cos \phi$ which is fed into the input of the digitizer 39.

*Digital Filter*

Figure 13:
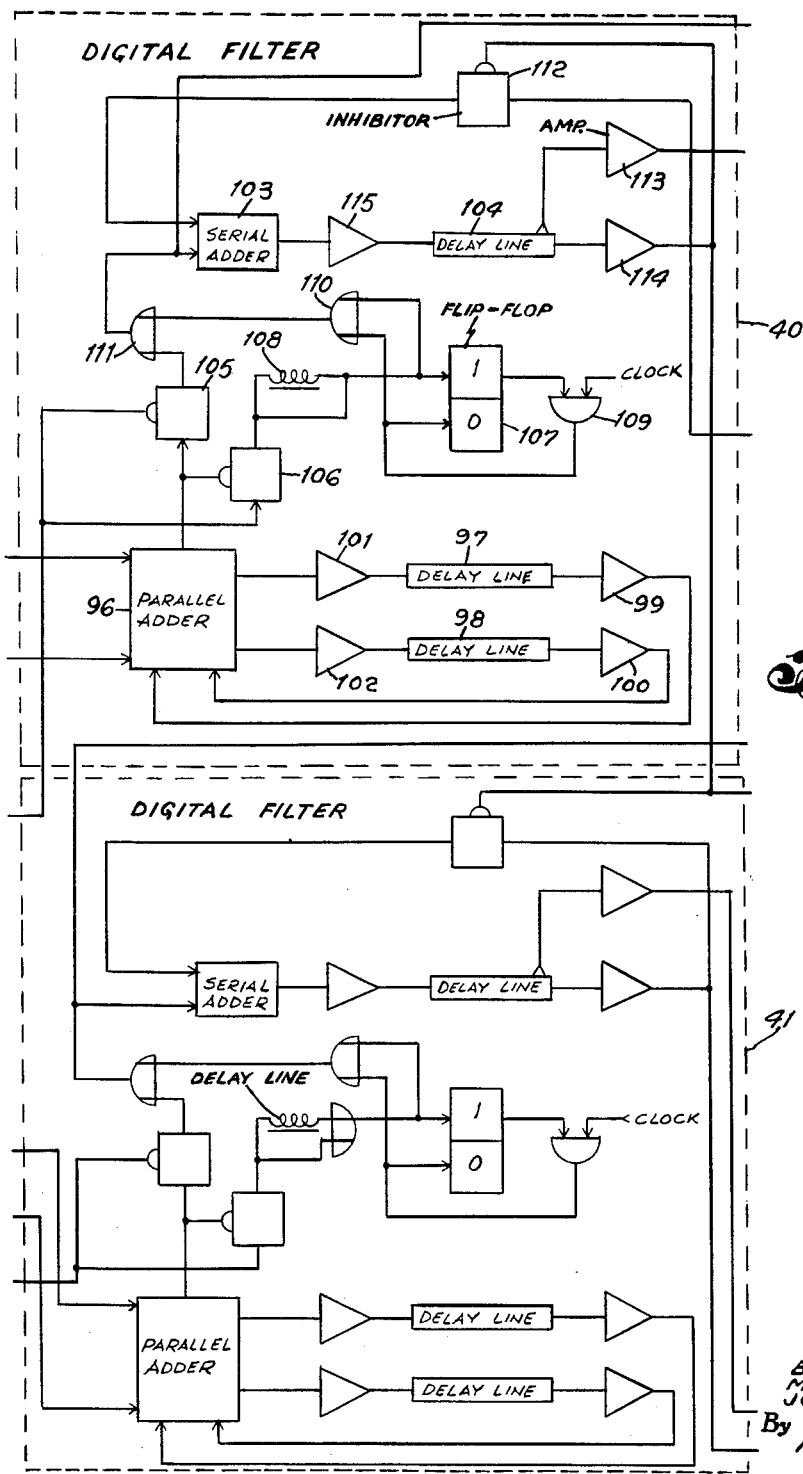

The three bits of binary information coming out of the digitizer 38 at 2-microsecond intervals are now fed into the digital filter 40 shown in expanded form in FIG. 13. The digital filtering process is essentially one of integration. In the filter 40 digitized radar returns after each transmitted pulse is added synchronously to the recirculating remainder in a parallel adder 96. This is done by applying both the output of the digitizer 38 and the recirculating remainder from the delay lines 97 and 98 through the receiver amplifiers 99 and 100 to the parallel adder 96 and feeding the output of the adder 96 back to the delay lines 97 and 98 through the transmitter amplifiers 101 and 102. A true target will continually contribute a return at a given range, and the results will be integrated. During a 6-degree sub-sector scan 12 main bangs are originated in the radar transmitter 32. Overflows from the parallel adder 96 may result from the addition process of each return to the remainder accumulated from the returns up to that time. These overflows which can result only from true targets are inscribed on an existence register which is a delay line and will be noted as part of the encoder circuit. The overflows are also added serially with previous overflows in a serial adder 102, and the result of the addition is stored in an overflow storage delay line 104. Since we are operating with a straight binary code, when negative numbers, i.e., numbers which have a pulse output of OR gate 95, are added to the parallel adder 96, an overflow indicates that the sum of the digitizer 38 output and the remainder is less than the level which requires that a unit overflow be subtracted from the accumulated overflow. Hence, an overflow occurring when a negative number has been applied to the parallel adder 96 should be disregarded and conversely, as is common in binary methematics, the lack of overflow indicates a level requiring a unit of overflow to be subtracted from the accumulated overflow. Hence, no overflow occurs when a negative number is applied to the parallel adder 96, it is understood that a unit must be subtracted from the contents of the overflow storage 104. This is accomplished by serially adding the binary number 1111 to that quantity. When a pulse exists on the output of the OR gate 95, it is applied to the inhibit input of INHIBITOR 105 and on the gated input of INHIBITOR 106. The overflow of the parallel adder 96 is applied to the gated input of INHIBITOR 105 and the inhibit input of the INHIBITOR 106. Therefore, when an overflow from the parallel adder 96 and a pulse input of OR gate 95 both exist, no signal is sent to the overflow storage 104. When only the output pulse of OR gate 95 exists, a flip-flop 107 is set into the one state and a pulse is sent down a 3-bit delay line 108. Clock pulses are anded in AND gate 109 and the result is used to reset flip-flop 107 and is put into OR gate 110. The output of the OR gate 110 and the output of INHIBITOR 105 is fed into OR gate 111. The output of OR gate 111 is fed into the serial adder 103. INHIBITOR 112 is in the recirculating path of overflow storage 104 as are receiver amplifiers 113 and 114 and transmitter amplifier 115.

Digital filter 41 has similar components and functions in the same manner as filter 40 when the output of digitizer 39 is fed into the filter 41.

The purpose of the clock control 33 is to supply control pulses throughout the system. With reference to FIG. 12 a crystal control oscillator 116 generates a 500 kc./s. sine wave. This is fed into a blocking oscillator 117 where a train of standard pulses are generated synchronized to the input sine wave. A standard pulse in this system is .5 microsecond wide. This train of pulses with 500 kc./s. rate is used for reclocking purposes in the other units of the system. It is also counted down by a pulse distributor 118 to obtain special clocking pulses ($T_1$ through $T_{13}$) which are used in the system as reset pulses, radar transmitter synchronization, etc. In order to obtain the coded range, a programmed counter 119 must accept the basic clock pulses and certain outputs of the pulse distributor. Then the programmed counter 119 is able to generate a four bit binary coded word whose value at any pulse time after the main bang would indicate the range of a target having a return at that pulse time. One of the clocking pulses $T_n$ is selected to trigger the radar transmitter 32.

Figure 14:
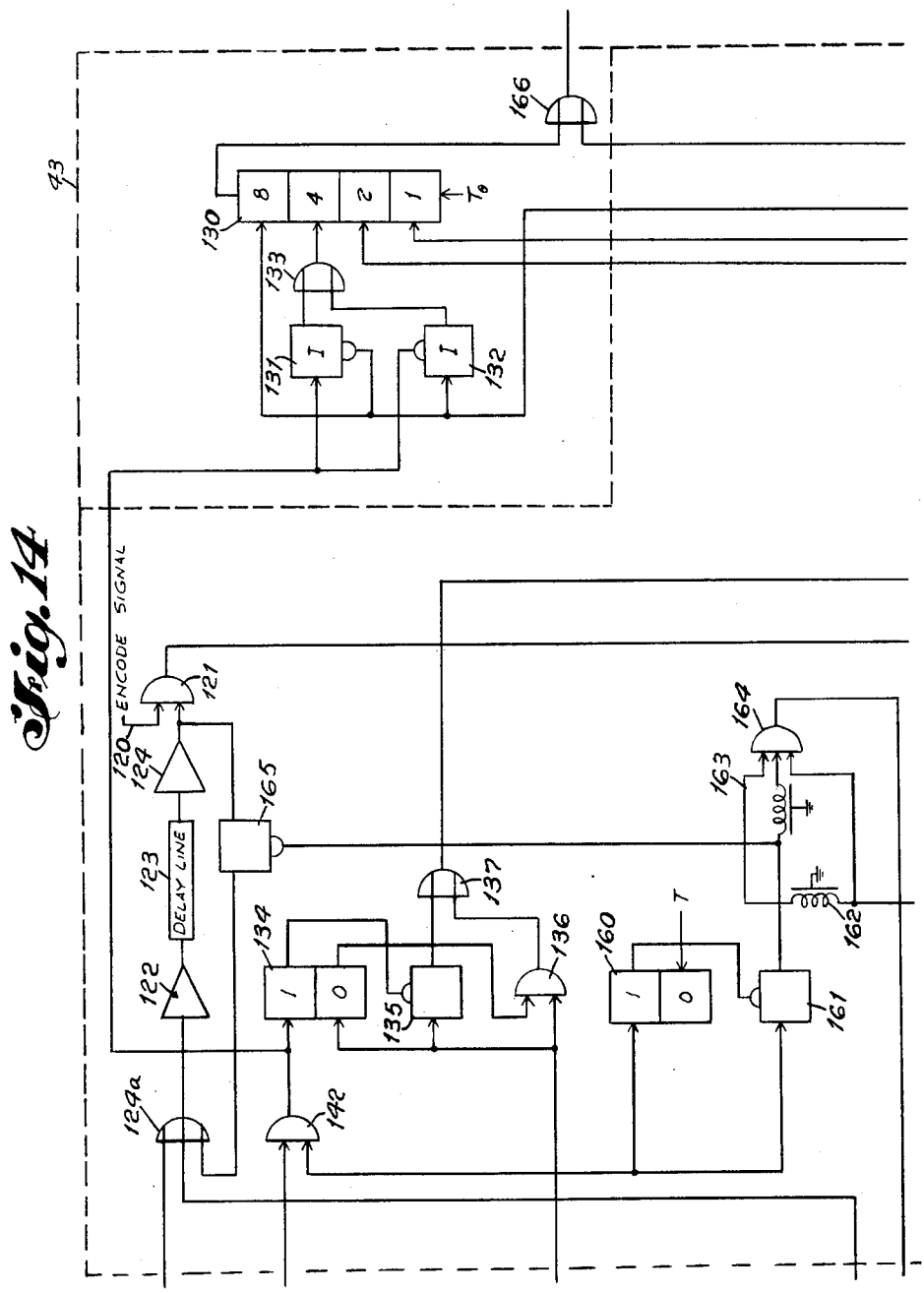
Figure 15:
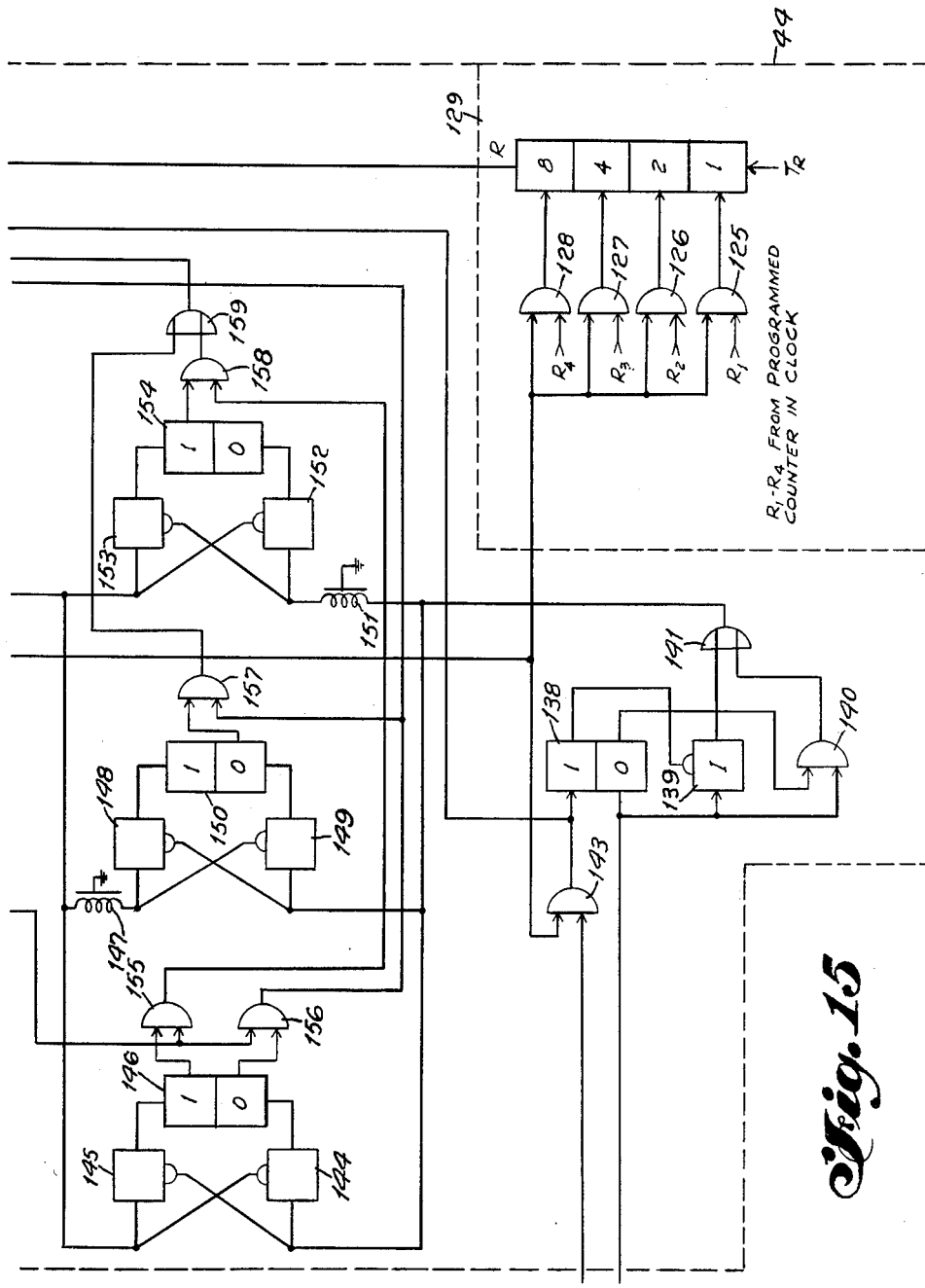
Figure 21:
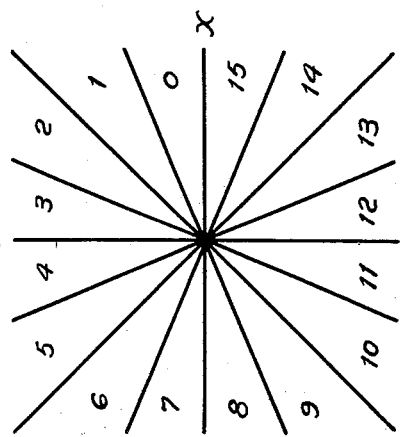
FIG. 21 is a diagram showing the relationship between the electrical phase and the angle code.

During the encode cycle in the encoding circuit 42 shown in FIGS. 14 and 15, an encode signal 120 from commutator 48 is applied to AND gate 121. An existence delay line composed of transmitter amplifier 122, delay line 123 and receiver amplifier 124 and OR gate 124a is then examined for pulses. When one is detected in the receiver amplifier 124 and is in coincidence with the encode signal 120, there is an output from AND gate 121. The range as determined by the programmed counter 119 in the clock 33 is fed into range storage 44. The bits of the range words $R_1$, $R_2$, $R_3$ and $R_4$ as determined by the programmed counter 119 are anded with the output AND gate 121 in AND gates 125, 126, 127, and 128 and the outputs thereof set the range storage shift register 129. Simultaneously, the encoding process for the 4 bit serial words which indicate azimuth on the overflow registers 104 in the digital filters 40 and 41 (104a not shown) is begun. The first step in the encoding process is to determine the signs of the quantities in both overflow registers 104 and 104a. The sign of one of these words is negative when a pulse exists in the 4th bits. FIGS. 21 and 22 indicate the rules for determining the angle code word. On delay line 104 occur Y words, and on line 104a occur X words. The signs of X and Y are sensed by the special receiver amplifiers 113 and 113a (not shown). Should there be a sign bit indicating that the Y overflow is negative, the fourth bit of the angle storage shift register 130 in the angle storage 43 is set. Should also the X bit not be present, the third bit of the angle code is set. Furthermore, if the Y is not present and the X is present, the third bit is set. This process is accomplished by INHIBITORS 131 and 132 and OR gate 133. If the contents of register 104a shows negative, i.e., a pulse was present in the fourth bit, the remaining three bits of the serial word must be inverted. The inversion process for Y is accomplished in flip-flop 134, INHIBITOR 135, AND gates 136 and 142 and OR gate 137, and for X, in flip-flop 138, INHIBITOR 139, AND gates 140 and 143 and OR gate 141. To obtain the second bit of angle code, we must find whether X is larger than Y. This is done by comparing the three bits of X and the three bits of Y in the INHIBITORS 144 and 145 and setting the results in flip-flop 146. The final bit of the angle code is obtained by comparing the smaller of the two quantities with one half of the larger. This is done in the system by delaying Y in the delay line 147 (this is equivalent to multiplying it by 2) and comparing it with X in the same way as X and Y were compared previously. INHIBITORS 148 and 149 and flip-flop 150 accomplish this process. Also, X delayed one bit in delay line 151 is compared with Y in INHIBITORS 152 and 153 and flip-flop 154. The final results of this comparison process, depending upon the results of the comparison of X and Y, are used to determine the final bit of the angle code. AND gates 155, 156, 157, 158 and OR gate 159 make this determination. Flip-flop 160, INHIBITOR 161, delay lines 162 and AND gate 164 generate erasing pulses for INHIBITORS 112, 112a (not shown) and 165. After the angle is completely encoded, the values in the angle storage 130 and range storage 129 are shifted into the buffer storage 45 through OR gate 166 with proper timing to set up a word.

Figure 23:
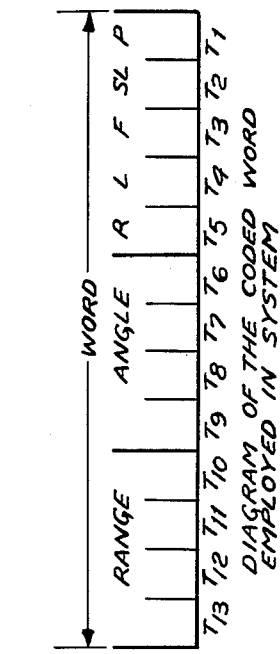
FIG. 23 is a diagram of the coded word employed in the system.
Figure 20:
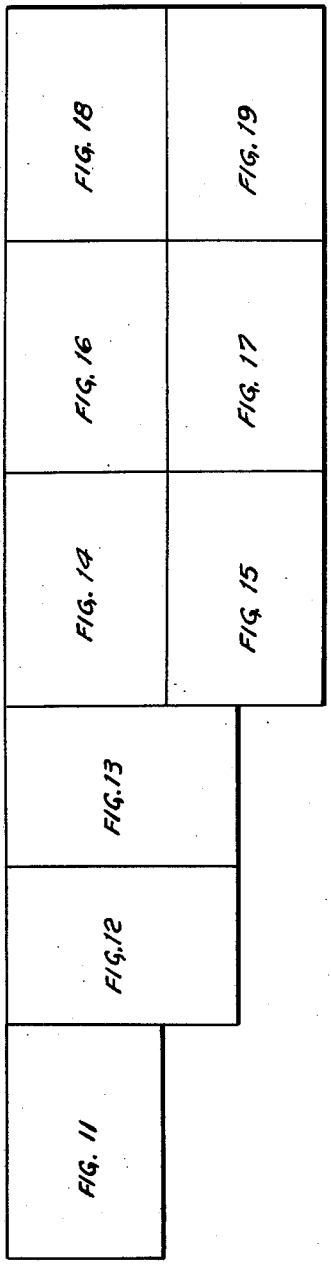
FIG. 20 shows the arrangement for assembling FIGS. 11–19.

FIG. 23 shows the characters used in the complete coded word for use in this system. $T_{13}$ through $T_{10}$ indicate the range information, $T_9$ through $T_6$ indicate the angle information which is supplied by the encoding circuit 42. The other information $T_5$ to $T_1$ is supplied by the logic circuit 47 as will be explained later.

Figure 18:
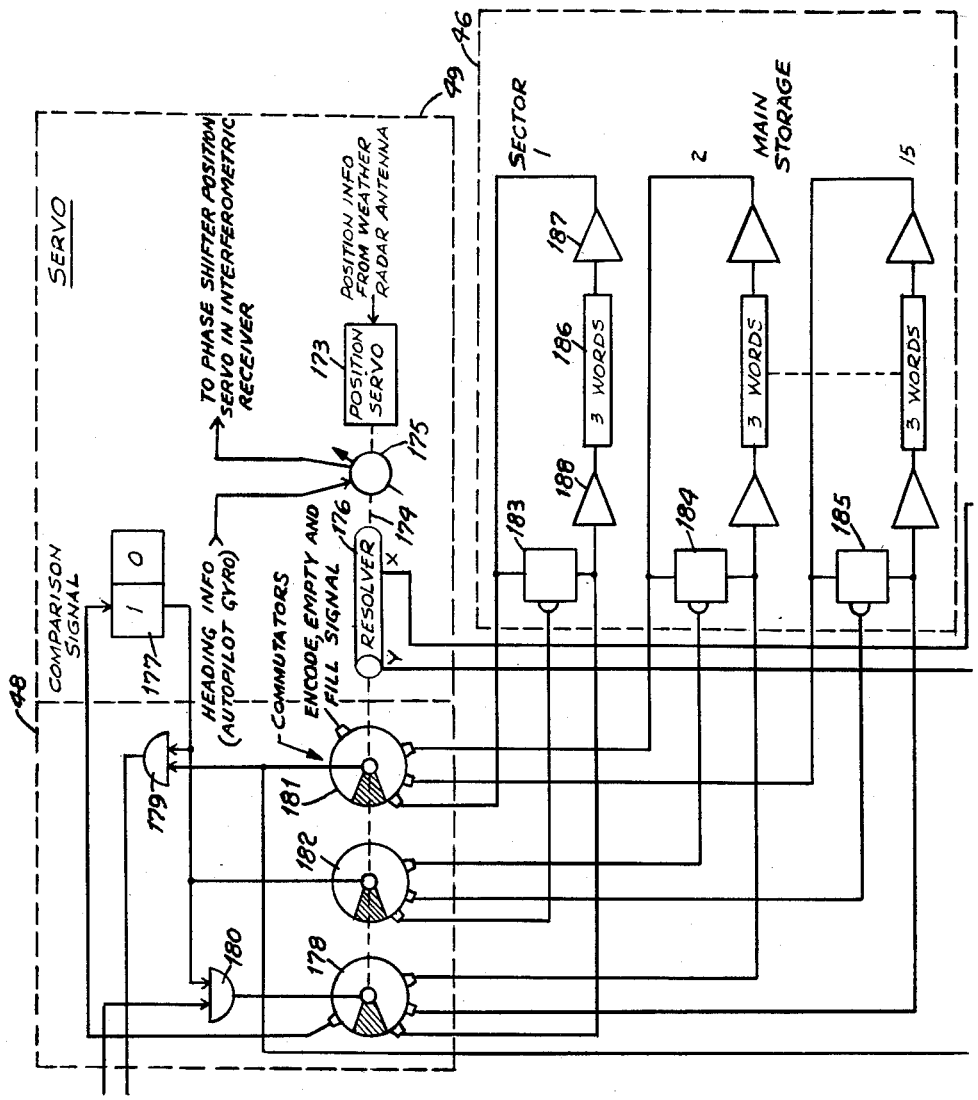

The purpose of the servo 49 shown in FIG. 18 is to provide in the system a shaft position which follows up the shaft position of the radar transmitting antenna. Coupled to the position servo 173 by shaft 174 is a nonlinear device 175, such as a function potentiometer, which operates on the heading information from the aircraft autopilot gyro to put it into the correct form to apply to the phase shifter position servo 57 in the interferometer receiver 37. Coupled also to the shaft 174 is a resolver 176 which generates analog voltages to be used in the scope decoder 52 for the visual display 53. Also attached to this shaft is the commutator 48. The purpose of the commutator 48 is to select certain outputs of the main storage 46. Flip-flop 177 when set into the one state by the comparison signal from commutator disk 178 will energize AND gates 179 and 180. AND gate 179 will allow the stored words from the main storage to go into the logic circuit 47. AND gate 180 will allow the words returned from the logic circuit to be put back into the main storage 46. Commutator disk 181 makes the selection of the words to leave the main storage, commutator disk 178 makes the selection of the part of main storage to redeposit the words, and commutator disk 182 selects any one of the INHIBITORS 183, 184, and 185, and so on for a total of fifteen INHIBITORS. For purposes of illustration only three are shown. It will be noted that the commutator disks 178, 181 and 182 are rigidly coupled to the shaft 174 so that they electrically connect to the proper input of the same sector in main storage. The main storage has 15 sectors each having a 39 bit circulating delay line 186 coupled to a receiver amplifier 187 and a transmitter amplifier 188. Each sector corresponds to a 6-degree sub-sector of the 90-degree forward scan sector and stores the position information and type of intruder of not more than three intruders in each sector.

Figure 16:
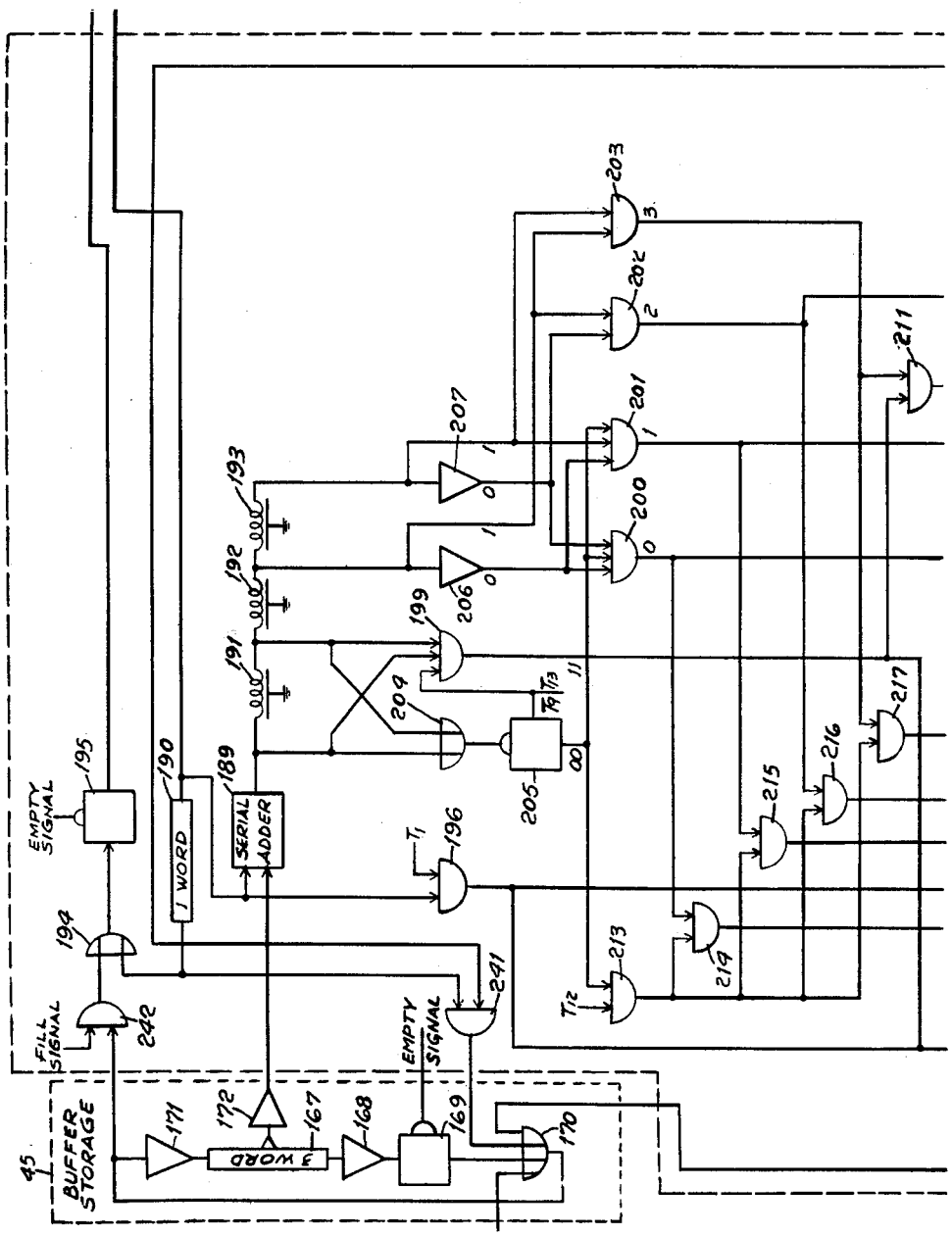

During the encoding process as many as three words are formed and stored in the buffer storage 45 shown in FIG. 16. Buffer storage 41 remembers these words by recirculating them in a delay line 167. Three words are the maximum that is used in this version of the collision avoidance system and represents the position information of three intruders in a 6-degree sub-sector of the forward sector. It is to be understood that more than three words can be stored with appropriate changes in the circuitry. Associated with delay line 167 in its recirculating loop are receiver amplifier 168, INHIBITOR 169, OR gate 170, and transmitter 171.

FIG. 24 shows graphically the criteria for the logic. The sketch represents the zone 23a in space around the intruder and is similar to the criteria of FIG. 7 with the four S cells removed. The center cell with label A is the reference position, and the location of the intruder information from the main storage 46. The horizontal direction indicates displacement in the angular coordinate, and the vertical direction displacement in the range coordinate also as shown in FIG. 7. Then the new intruder coordinates should fall in one of the cells in the zone. The proper procedure to be followed for the decision on the basis of the position of the new target is show in FIG. 24 and reproduced here. The rules for which information to put into main storage are also applied here as follows:

A  Hold old information
    B  Hold old, label as possible
    C  Put in new, label as slow threat
    D  Put in new, label as fast threat Furthermore, the side on which the intruder will pass, and hence the avoidance maneuver, can be deduced by seeing whether the new target appears to the right or the left of the reference (i.e., the difference in angle coordinate is positive or negative). It is to be understood that the size and shape of the cells shown in FIG. 24 do not show the exact size of the cells as determined by the range and azimuth boundaries.

When the comparison is finished and the intruder information is labeled as to whether it is a threat or not and on which side is the danger, it is reinserted into the main storage 46.

Figure 17:
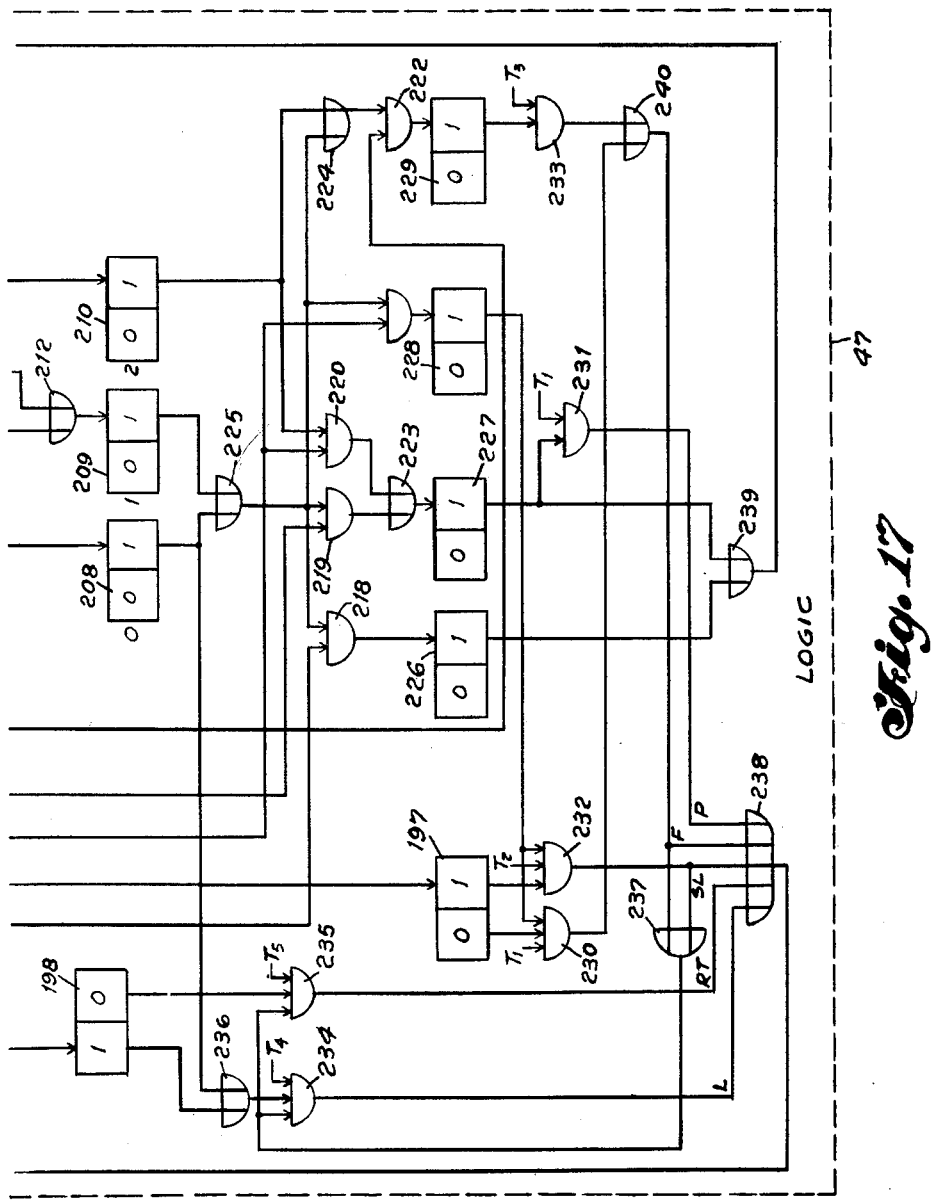

The input signals to the logic circuit 47, shown in FIGS. 16 and 17, come from the buffer storage 45 and the main storage 46 through commutator 48. The words from the buffer storage are received from the receiver amplifier 172 and are fed into a serial adder 189. The words from the main storage 46 which come via disk 181 of the commutator 48 are fed to the serial adder 189 and a one word delay line 190. The output of the serial adder 189 is fed down the delay lines 191, 192, and 193 giving four bits of comparison information. Likewise, the output of the one word delay line 190 is fed into OR gate 194 and through INHIBITOR 195 and AND gate 180 and back through 178 of the commutator 48. The first bit of the word coming from the main storage is anded with $T_1$ in an AND gate 196. The results are used to set flip-flops 197 and 198. If a pulse exists as the output of this AND gate 196, this indicates that the intruder represented by the coded word from the main storage 46 has been previously designated a possible threat. AND gtaes 199, 200, 201, 202, and 203, OR gate 204, INHIBITOR 205 and inverters 206 and 207 are used to determine whether the difference in coded coordinate is positive, negative and of magnitude 0, 1, 2, or 3. If an output of any of the AND gates 200, 201, 202 and 203 exists, it is used to set its respective associated flip-flops 208, 209, and 210. The output of 203 sets flip-flop 209 through AND gate 211 and OR gate 212. During the range comparison, the output of INHIBITOR 205 is anded in AND gate 213 with $T_{12}$ and an output here indicates a positive range within the zone 23a. In a way similar to the measuring of the size of the angle difference, the same components determine the magnitude of the range difference. Therefore, a pulse exists on one of the outputs of gates 200, 201, 202 and 203. If an output of any of the AND gates 200, 201, 202 and 203 exists, it is anded with its respective associated AND gate 214, 215, 216 and 217. The state of flip-flops 208, 209 and 210 together with a pulse from any one of the AND gates 214, 215, 216 and 217 coupled to the AND gates 218, 219, 220, 221, 222 and OR gates 223, 224 and 225 set flip-flops 226, 227, 228 and 229. Flip-flops 197, 198, 226, 227, 228, 229 determine the nature of the threat whether safe, possible threat or threat and the side from which it is coming. AND gates 230, 231, 232, 233, 234, 235 and OR gates 236, 237, 238, 239 and 240 are used with clock pulses $T_1$ through $T_5$ to fill the five bits representing the nature of the target thus completing the coded word as shown in FIG. 23. The output of OR gate 239 opens AND gate 241 to allow the word in delay line 190 to be fed into OR gate 170. The fill signal energizes AND gate 242 allowing the contents of the buffer storage to be inserted in the main storage.

The scope decoder 52 also uses the commutator 48 to examine the main storage sector by sector. When a threat is found, the range and sector information is decoded into voltages for the visual presentation scope 53 and for the warning device 54. The type of intruder (i.e., slow threat, fast threat, left, right) controls the nature of the actual blip to appear on the cathode ray tube as shown in FIG. 9.

Figure 19:
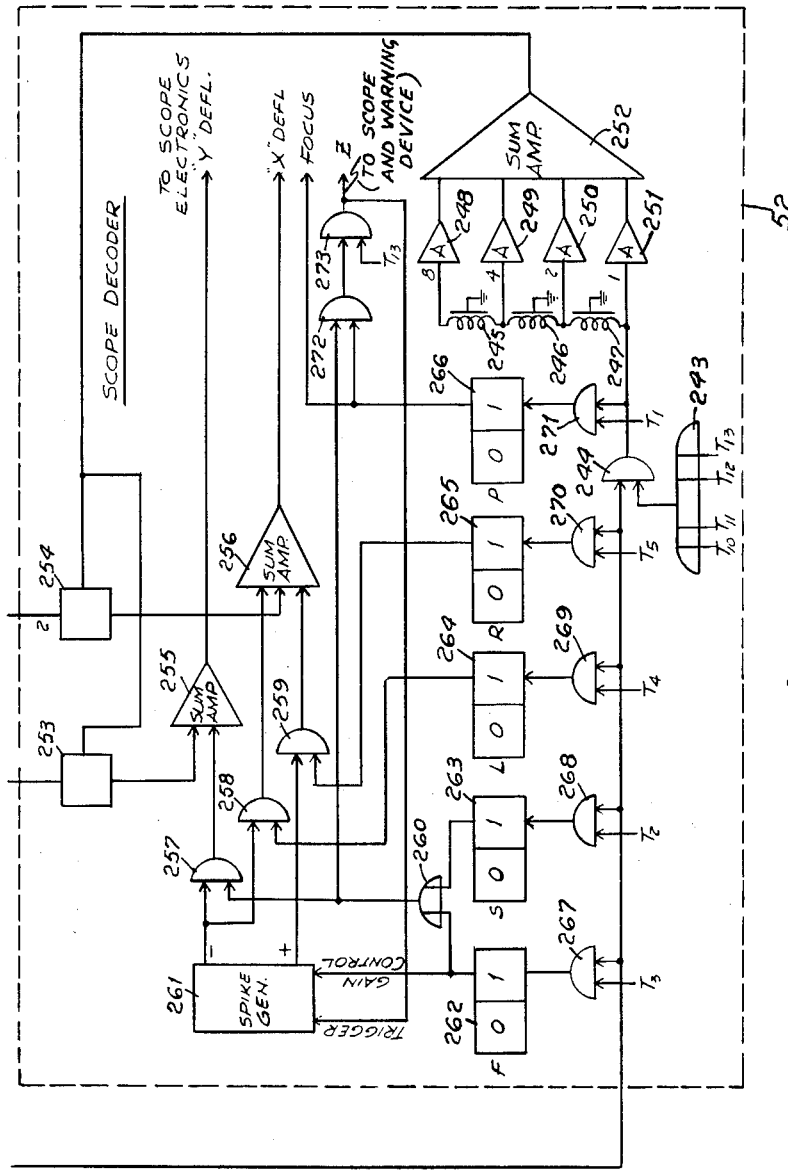

FIG. 19 shows the scope decoder. The purpose of this device is to receive coded binary words concerning the nature and range of the targets in a particular sector of the main storage 46 from the commutator disk 181 of commutator 48 and analog voltage signals from the resolver 174 and to generate the deflection and modulation voltages for the visual display scope 53. An analog voltage proportional to range is secured through the use of OR gate 243, AND gate 244, delay lines 245, 246 and 247, weighted gain amplifiers 248, 249, 250 and 251 and summing amplifier 252. The output of summing amplifier 282 is fed into modulator 253 to secure as the output thereof the Y deflection voltage for the scope. It is also fed into modulator 254 to secure as the output thereof the X deflection voltage of the scope. Superimposed upon these deflection voltages by means of summing amplifier 255 and 256 and AND gates 257, 258, and 259 and OR gate 260 are signals from a spike generator 261.

Flip-flops 262, 263, 264, 265 and 266 are set by AND gates 267, 268, 269, 270, 271 whose inputs consist of clock pulses $T_1$ through $T_5$ and the coded word from the main storage. AND gates 272 and 273 determine the intensity signal output of the scope decoder.

The warning device 54 is preferably an aural warning device such as a buzzer which is energized by the intensity voltage output of the scope decoder 52.

Although this system is a self-contained system having both radar transmitter and receiver located on the equipped plane, it can be modified to operate in a cooperative manner when intruders are equipped with transponders. This will afford increased range coverage, and additional altitude discrimination.

While we have described above the principles of our invention in connection with specific apparatus, it is to be clearly understood that this description is made only by way of example and not as a limitation to the scope of our invention as set forth in the objects thereof and in the accompanying claims.

We claim:

1. A collision avoidance system for on board an aircraft comprising means to obtain successive information of azimuth and range with respect to flight positions of said aircraft of an object detected within a given area relative the flight course of said aircraft, means to store said successive information, and means responsive to said successive azimuth and range information of said object with reference to the flight course of said aircraft to determine whether said object imposes a collision threat with respect to the flight course of said aircraft.

2. A collision avoidance system for on board an aircraft comprising means to obtain successive information of azimuth and range with respect to flight positions of said aircraft of an object detected within a given area relative the flight course of said aircraft, means to store said successive information, means responsive to said successive azimuth and range information of said object with reference to the flight course of said aircraft to determine whether said object imposes a collision threat with respect to the flight course of said aircraft, and means to indicate to the pilot of said aircraft of such collision threat to enable the pilot to effect an evasive maneuver to avoid collision.

3. A collision avoidance system for on board an aircraft comprising means to obtain successive information of azimuth and range with respect of flight positions of said aircraft of an object intruding into a given area relative the flight course of said aircraft, means to store said successive information, and means responsive to said successive azimuth and range information of said intruding object with reference to the flight course of said aircraft to determine whether said intruding object is proceeding along a possible collision course with respect to the flight course of said aircraft.

4. A collision avoidance system for on board an aircraft comprising means to obtain successive information of azimuth and range with respect to flight positions of said aircraft of each one of a plurality of objects detected within a given area relative the flight course of said aircraft, means to store said successive information, means responsive to said successive azimuth and range information of each of said objects with reference to the flight course of said aircraft to determine whether any of said objects is imposing a collision threat with respect to the flight course of said aircraft, and means to indicate to the pilot of said aircraft of the collision threat of any of said objects to enable the pilot to effect an evasive maneuver to avoid collision.

5. A collision avoidance system for on board a first aircraft comprising means to obtain successive information of azimuth and range with respect to flight positions of said first aircraft of a second aircraft intruding into a given area relative the flight course of said first aircraft, means responsive to said successive azimuth and range information of said second aircraft with reference to the flight course of said first aircraft to determine whether said second aircraft is proceeding along a possible collision course with respect to the flight course of said first aircraft, and means to indicate to the pilot of said first aircraft of the threatened collision course of said second aircraft and whether said second aircraft imposes a fast or a slow threat.

6. A collision avoidance system for on board a first aircraft comprising means to obtain successive information of azimuth and range with respect to flight positions of said first aircraft of other aircraft intruding into a given area relative the flight course of said first aircraft, means responsive to said successive azimuth and range information of each of said intruding aircraft with reference to the flight course of said first aircraft to determine whether any of said intruding aircraft is proceeding along a possible collision course with respect to the flight course of said first aircraft, and means to indicate to the pilot of said first aircraft of each of said other aircraft which is proceeding along a possible collision course and which of said other aircraft imposes an immediate threat.

7. A collision avoidance system for use on an aircraft comprising means to obtain successive information of azimuth and range with respect to the flight positions of said aircraft of an object intruding into a given area relative the flight course of said aircraft, means responsive to the azimuth and range information of said object for predicting a zone indicative of possible collision with said aircraft and means for comparing successive azimuth and range information of said object to determine whether said object is proceeding into said zone of possible collision.

8. A collision avoidance system for use on an aircraft comprising means to obtain successive information of azimuth and range with respect to the flight positions of said aircraft of each of a plurality of objects entering a given area relative the flight course of said aircraft, means responsive to the azimuth and range information of each of said objects for predicting a plurality of zones indicative of possible collision with said aircraft, one of such zones for each of said objects, and means for comparing successive azimuth and range information of each of said objects to determine whether any of said objects is proceeding into its respective zone of possible collision.

9. A collision avoidance system according to claim 8, further including means responsive to the output of said comparing means to indicate the presence of said objects in said given area and to present each of said indications to inform the pilot as to whether the indicated object is following a safe course, a course imposing a possible collision threat or a course imposing a real threat of collision.

10. A collision avoidance system for use with a radar on board an aircraft, comprising means to detect re-radiations of the radar signals from objects within a given area relative the flight course of said aircraft, means to derive from said signal re-radiations the azimuth and range information of successive positions of each of said objects, means responsive to the azimuth and range information of each of said objects to predict zones indicative of possible collision between each of said objects and said aircraft, and means to compare successive azimuth and range information of each of said objects to determine the course of each of said objects relative the respective collision zone of each of said objects.

11. A collision avoidance system according to claim 10, wherein the means for predicting zones indicative of possible collision includes logic and storage circuits responsive to the azimuth and range information of a given object to establish a matrix of imaginary cells in space about said given object, certain of said cells lying in said zone and others lying outside said zone, and said comparing means includes means to determine from subsequently received azimuth and range information of said given object character of said cells through which said given object is passing.

12. A collision avoidance system for use on an aircraft comprising means to obtain successive information of azimuth and range of an object entering a given area relative the flight course of said aircraft, means responsive to the azimuth and range information of said object to establish a matrix representing imaginary cells in space wherein one of said cells includes the instant location of said object certain of said cells being characterized as indicative of collision threat and others as safe from collision threat, and means for comparing subsequently obtained azimuth and range information of said object with said matrix to determine through which of said cells said object is passing.

13. A collision avoidance system according to claim 12, wherein said comparing means includes means to determine the relative speed of said object so that, should subsequent information show said object is proceeding on a collision course, said speed will indicate whether said object imposes a fast or slow threat of collision.

14. In apparatus of the character described having radar means to scan space for detection and tracking of moving objects; means to determine from re-radiation of radar signals by an object in space the azimuth and range information of said object, means responsive to said information to establish a matrix representing imaginary cells in space wherein one of said cells includes an instant location of said object, and means for comparing subsequently obtained azimuth and range information of said object with said matrix to determine which of said cells includes the course of movement of said object.

15. In apparatus of the character described having radar means to transmit radar signals to scan space for detection and tracking of moving objects; receiver means having two sets of first and second antennas, one set for course detection of azimuth and the other set for fine detection of azimuth of a detected object, a first synchronous detector, a second synchronous detector, circuit means including a first set of switches to couple the first set of antennas to said first and second detectors, respectively, and a second set of switches to connect said second set of antennas to said first and second detectors, respectively, and means to synchronize said first and second sets of switches with the radar transmitter for alternate coupling of said first and second sets of antennas to said first and second detectors.

16. In apparatus of the character described having radar means to scan space for detection and tracking of moving objects and receiver means to obtain azimuth signals in the form of sine and cosine of the angle of azimuth to a given detected object, a first means to convert the sine signal into a digital signal, second means to convert the cosine signal into a digital signal and means to integrate the two digital signals to obtain a single signal indicative of the angle of azimuth to said given object, each of said means for converting the sine and cosine signals having a series of comparator devices, means to apply the input signal to each of said comparator devices, means to apply a positive voltage to one-half of said comparator devices in different values, means to apply a negative voltage to the other half of said comparator devices in different values and a matrix of gates coupled to the outputs of said comparator devices to obtain a digital output corresponding to the instantaneous value of said sine and cosine signals.

17. In apparatus of the character described having radar means to scan space for detection and tracking of moving objects and receiver means to obtain azimuth signals in the form of sine and cosine of the angle of azimuth to a given detected object, a first means to convert the sine signal into a digital signal, second means to convert the cosine signal into a digital signal and means to integrate the two digital signals to obtain a single signal indicative of the angle of azimuth to said given object, each of said means for converting the sine and cosine signals having a series of comparator devices, means to apply the input signal to each of said comparator devices, means to apply a positive voltage to one half of said comparator devices in different values, means to apply a negative voltage to the other half of said comparator devices in different values and a matrix of gates coupled to the outputs of said comparator devices to obtain a digital output corresponding to the instantaneous value of said sine and cosine signals, means to measure lapse of time between the transmitted radar signal and receipt of the re-radiation thereof by said given object to obtain a range signal representing the range to said given object, means to translate said range signal into a range code signal, and a logic circuit coupled to receive said azimuth and range code signals to establish matrix record representing an imaginary matrix of cells in space, one of which includes the location of said given object and certain of which represent collision zone threat and still others represent a safe zone.

18. A collision avoidance system for use on aircraft comprising radar means to transmit signals, receiving means to receive re-radiations of said signals from objects within a given area relative the flight course of said aircraft, said receiving means having spaced antenna means to obtain a phase relationship of the re-radiated signals which are in a sine and cosine form representative of the azimuth angle of a given object, means to convert the sine and cosine signals into a code signal which is indicative of the azimuth angle, means to measure the time lapse between the transmitted radar signal and receipt of the re-radiation thereof by said given object to obtain a range code signal of said object, a logic circuit to establish in response to azimuth and range code signals of said given object to establish a matrix record representing an imaginary matrix of cells in space wherein one of said cells includes an instant location of said object, and certain of said cells represent a collision zone threat and other of said cells represent a safe zone, and means to compare subsequently received azimuth and range information signals to determine which of the cells of said matrix includes the course of movement of said given object.

19. A collision avoidance system for use on aircraft comprising radar means to transmit signals receiving means to receive re-radiations of said signals from objects within a given area relative the flight course of said aircraft to obtain azimuth and range signals of objects entering said area, means to translate said azimuth and range signals into code signals, a logic circuit to establish in response to said azimuth and range code signals to establish matrix records of an imaginary matrix of cells in space for each of the detected objects, one of the cells of each matrix representing an instant location of one of said objects, means synchronizing to said radar means to compare each matrix record with subsequently received azimuth and range code signals of respective objects to determine which of the cells of said matrix includes the course of movement of the corresponding object, a display indicator and means to apply the azimuth and range code signals of each detected object to said display means to indicate the relative position thereof with respect to said aircraft and whether the course of movement of each object is a safe course, a possible threat and whether the threat is a slow or fast threat.

20. A collision avoidance system for use on aircraft comprising radar means to transmit signals, receiving means to receive re-radiations of said signals from objects within a given area relative the flight course of said aircraft, said receiving means having spaced antenna means to obtain a phase relationship of the re-radiated signals which are in a sine and cosine form representative of the azimuth angle of a given object, means to convert each of the sine and cosine signals into digital signal form, means to integrate the digital signal forms obtained from said sine and cosine signals and to translate same into a code signal which is indicative of the azimuth angle, means to measure the time lapse between the transmitted radar signal and receipt of the re-radiation thereof by said given object to obtain a range signal representing the range of said given object, means to translate said range signal into a range code signal, a logic circuit to establish in response to azimuth and range code signals of said given object to establish an imaginary matrix of cells in space wherein one of said cells includes an instant location of said object and certain of said cells represent collision zone threat and still other of said cells represent safe course, a main storage means, a buffer circuit coupling the azimuth and range coded signals to said logic circuit, commutator means coupling the azimuth and range coded signals to said main storage, means synchronizing said commutator means to said radar means to apply the stored coded information in said main storage to said logic circuit for comparison with subsequently received azimuth and range coded signals to determine which of the cells of said matrix includes the course of movement of said given object, a display indicator and means to apply the azimuth and range signals of said given object to said display means to indicate the relative position of said given object with respect to said aircraft and whether the course of movement of said given object is a safe course, a possible threat and whether the threat is a slow or fast threat.

References Cited in the file of this patent

UNITED STATES PATENTS 2,499,349  Ayres ----------------- Mar. 7, 1950

OTHER REFERENCES

"Heart of Anti-Collision System," by James Holahan, Aviation Age, December 1956, vol. 26, No. 6, pp. 80–85.